US011913255B2

(12) United States Patent
Miller et al.

(10) Patent No.: US 11,913,255 B2
(45) **Date of Patent: *Feb. 27, 2024**

(54) DEVICE AND METHODS FOR PREVENTING UNWANTED ACCESS TO A LOCKED ENCLOSURE

(71) Applicant: LOCK II, LLC, Nicholasville, KY (US)

(72) Inventors: J. Clayton Miller, Nicholasville, KY (US); Brian T. Craycraft, Lexington, KY (US); John H. Janes, Lexington, KY (US); Benjamin T. Redmon, Lexington, KY (US)

(73) Assignee: LOCK II, LLC, Nicolasville, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/117,856

(22) Filed: Mar. 6, 2023

(65) Prior Publication Data

US 2023/0203845 A1 Jun. 29, 2023

Related U.S. Application Data

(60) Continuation of application No. 16/697,006, filed on Nov. 26, 2019, now Pat. No. 11,613,911, which is a (Continued)

(51) Int. Cl.
*E05B 47/00* (2006.01)
*E05B 15/00* (2006.01)
(Continued)

(52) U.S. Cl.
CPC .......... *E05B 47/0012* (2013.01); *E05B 15/00* (2013.01); *E05B 17/10* (2013.01);
(Continued)

(58) Field of Classification Search
CPC .... E05B 47/0012; E05B 17/10; E05B 17/226; E05B 49/00; E05B 2047/002;
(Continued)

(56) References Cited

U.S. PATENT DOCUMENTS 5,517,184 A * 5/1996 Miller ................ G07C 9/00912 340/5.55
5,870,914 A * 2/1999 Dawson ............. G07C 9/00912 340/5.55

(Continued)

*Primary Examiner* — Suzanne L Barrett
(74) *Attorney, Agent, or Firm* — ROONEY IP, LLC

(57) ABSTRACT

A device for preventing unwanted opening of a locked enclosure includes a lock bolt moveable between a locked position and an unlocked position. A face gear is meshable with and rotatable by the worm gear between locking and unlocking positions when the worm gear is driven in the first and second directions, respectively. A blocker member is rotatable between first and second positions. A biasing member is operatively coupled to the face gear and the blocker member to bias the blocker member in a biasing direction. A sliding member selectively disengages the blocker member to allow the blocker member to rotate in the biasing direction. A lever arm is operatively coupled to the sliding member such that the lever arm is in the disengaged and engageable positions when the sliding member engages the blocker member in the first and second positions, respectively.

6 Claims, 31 Drawing Sheets

Related U.S. Application Data division of application No. 15/798,974, filed on Oct. 31, 2017, now Pat. No. 10,557,285, which is a division of application No. 14/739,376, filed on Jun. 15, 2015, now Pat. No. 9,816,294, which is a division of application No. 14/132,117, filed on Dec. 18, 2013, now Pat. No. 9,080,349.

(60) Provisional application No. 61/739,437, filed on Dec. 19, 2012.

(51) Int. Cl.
*E05B 17/10* (2006.01)
*E05B 17/22* (2006.01)
*E05B 37/00* (2006.01)
*E05B 47/06* (2006.01)
*E05B 49/00* (2006.01)
*E05B 65/00* (2006.01)
*E05C 1/02* (2006.01)
*G07C 9/00* (2020.01)

(52) U.S. Cl.
CPC ............ *E05B 17/226* (2013.01); *E05B 37/00* (2013.01); *E05B 47/0676* (2013.01); *E05B 47/0688* (2013.01); *E05B 49/00* (2013.01); *E05B 65/0075* (2013.01); *E05B 65/0082* (2013.01); *E05C 1/02* (2013.01); *G07C 9/00666* (2013.01); *E05B 2047/0021* (2013.01); *E05B 2047/0031* (2013.01); *E05B 2047/0062* (2013.01); *E05B 2047/0069* (2013.01); *Y10T 70/7051* (2015.04); *Y10T 70/7062* (2015.04); *Y10T 70/7085* (2015.04); *Y10T 70/7107* (2015.04); *Y10T 70/7113* (2015.04)

(58) Field of Classification Search
CPC .... E05B 49/002; E05B 49/003; E05B 49/004; E05B 37/00; E05B 15/00; E05B 2047/0021; E05B 47/0676; E05B 47/0688; E05B 65/0075; E05B 65/0082; E05B 2047/0031; E05B 2047/0069; E05B 2047/0062; Y10T 70/7051; Y10T 70/7062; Y10T 70/7085; Y10T 70/7107; Y10T 70/7113; Y10T 70/7254; F16H 2005/173; G07C 9/00666; E05C 1/02
USPC ............................................ 70/303 A, 278.4
See application file for complete search history.

(56) References Cited

U.S. PATENT DOCUMENTS 5,896,026 A * 4/1999 Higgins ............ G07C 9/00896 70/280
11,613,911 B2 * 3/2023 Miller .................... E05B 15/00 70/277

* cited by examiner

DEVICE AND METHODS FOR PREVENTING UNWANTED ACCESS TO A LOCKED ENCLOSURE

CROSS-REFERENCE TO RELATED APPLICATIONS

This application is a continuation of U.S. application Ser. No. 16/697,006, filed Nov. 26, 2019 which is a divisional of U.S. application Ser. No. 15/798,974, filed Oct. 31, 2017 (now U.S. Pat. No. 10,557,285), which is a divisional application of U.S. application Ser. No. 14/739,376, filed Jun. 15, 2015 (now U.S. Pat. No. 9,816,294) which is a divisional of U.S. application Ser. No. 14/132,117, filed Dec. 18, 2013 (now U.S. Pat. No. 9,080,349) which claims the priority of Application Ser. No. 61/739,437 filed Dec. 19, 2012, the disclosures of which are hereby incorporated by reference herein.

TECHNICAL FIELD

The present invention relates generally to locks and, more specifically, to high security locks adapted for use in safes and other security structures or areas.

BACKGROUND

Items of extremely sensitive nature or very high proprietary value often must be stored securely in a safe or other containment device, with access to the items restricted to selected individuals given a predetermined combination code necessary to enable authorized unlocking thereof. It is essential to ensure against unauthorized unlocking of such safe containers by persons employing conventional safe-cracking techniques or sophisticated equipment for applying electrical or magnetic fields, high mechanical forces, or accelerations intended to manipulate elements of the locking mechanism to thereby open it.

Numerous locking mechanisms are known which employ various combinations of mechanical, electrical and magnetic elements both to ensure against unauthorized operation and to effect cooperative movements among the elements for authorized locking and unlocking operations.

The present invention, as more fully disclosed hereinbelow, meets these perceived needs at reasonable cost with a geometrically compact, electrically autonomous, locking mechanism.

SUMMARY

In accordance with an exemplary embodiment of the present invention, a device for preventing unwanted opening of a locked enclosure is provided. The device includes a lock bolt mounted for movement between a locked position and an unlocked position. A lever arm moveable between disengaged and engageable positions is included and is operatively coupled to the lock bolt to move the lock bolt between the locked and unlocked positions. A rotary element is included and is engageable with the lever arm in the engageable position thereof, wherein rotation of the rotary element when the rotary element is engaged with the lever arm moves the lock bolt between the locked and unlocked positions. A worm gear driven by a motor in first and second directions is also provided. The device also includes a face gear meshable with and rotatable by the worm gear between first and second positions when the worm gear is driven in the first and second directions, respectively. A blocker member is included and is rotatable between locking and unlocking positions. A biasing member is also included and is operatively coupled to the face gear and the blocker member. As such, when the face gear rotates between the first and second positions, the biasing member biases the blocker member in a biasing direction. Specifically, the biasing direction is a direction of rotation of the face gear. A sliding member is provided that selectively engages and disengages the blocker member. The sliding member selectively disengages the blocker member to allow the blocker member to rotate in the biasing direction. The lever arm is operatively coupled to the sliding member such that the lever arm is in the disengaged and engageable positions when the sliding member engages with the blocker member in the locking and unlocking positions, respectively.

In an aspect of the invention, a first arm protrudes transversely from a rear side of the face gear and a second arm protrudes transversely from a front side of the blocker member in a direction opposite the first arm. The first and second arms interact with the biasing member to rotate the blocker member.

According to another exemplary embodiment of the present invention, a self-powered lock is provided. The self-powered lock includes a lock operable by a motor. The self-powered lock also provides a manually operable electricity generator generating electricity upon manual actuation by a user, the electricity being used to supply power input to a controller. An electricity storage device storing electricity generated by the electricity generator is provided. The controller determines a required amount of electricity to operate the motor and supplies electricity to the motor from the electricity storage device according to the required amount.

Another exemplary embodiment of the present invention is a self-powered lock including a lock operable by a motor. Also provided is a manually operable electricity generator generating electricity upon manual actuation by a user, the electricity being used to supply power input to a controller. An electricity storage device storing electricity generated by the electricity generator is provided. At least a portion of the electricity stored by the electricity storage device is used when the lock is operated. The electricity storage device is configured to store an unused portion of electricity after the lock is operated. The unused portion of electricity is usable for a subsequent lock operation to supply power input to the controller.

In accordance with the present invention, yet another exemplary embodiment of a self-powered lock includes a lock operable by a motor. A controller operative to supply electricity to the motor is provided. Also provided is a manually operable electricity generator operative to generate electricity upon manual actuation by a user. The electricity is used to supply power input to the controller. An electricity storage device operatively coupled to the electricity generator is provided. A rotatable lock dial coupled with the electricity generator to generate electricity upon rotation of the lock dial is also provided. In addition, a sensor sensing a rate of rotation of the lock dial is operatively coupled with the controller. The controller determines whether the lock dial is being rotated with an automated device. When the controller determines that the lock dial is being rotated with an automated device, the controller maintains the lock in a locked position regardless of whether a correct lock combination is input.

A further exemplary embodiment of the self-powered lock according to the present invention includes a lock operable by a motor and a display device operable to display information regarding the lock to a user. The lock also includes a manually operable electricity generator generating electricity upon manual actuation by the user. The electricity generator is electrically connected to the display device and the motor to supply electricity thereto for operating the lock and the display device.

A method of moving a lock bolt between locked and unlocked positions is provided in accordance with the present invention. The lock bolt is coupled to a lever arm moveable between engageable and disengageable positions. The lever arm is operatively coupled to a sliding member. The method includes driving a worm gear with a motor in a first direction, thereby rotating a face gear from a locking to an unlocking position. The method further includes biasing a blocker member with a biasing member in a biasing direction, the biasing direction being the direction of rotation of the face gear. As such, the biasing member interacts with the face gear and the blocker member. The method further provides preventing the rotation of the blocker member between locking and unlocking positions by a selective engagement between the blocker member and a sliding member, wherein the lever arm is in the disengaged and engageable positions when the sliding member engages the blocker member in the locking and unlocking positions, respectively. The method further provides releasing the selective engagement by an upward movement of the sliding member to rotate the blocker member in the biasing direction to the second position. As such, a user rotates a rotary element to cause upward movement by the lever arm interacting with the rotary element. Furthermore, the method provides that the rotary element is further rotated by the user to cause an engagement between the lever arm and the rotary element and downwardly move the sliding member, thereby reengaging the selective engagement. Further rotation of the rotary element after the engagement moves the lock bolt into the unlocked position.

In an aspect of the invention, the method provides driving the worm gear with the motor in a second direction, thereby rotating the face gear from the unlocking to the locking position. The method also provides biasing the blocker member with the biasing member in the biasing direction. Furthermore, the method provides moving the lock bolt to the locking position when the user rotates the rotary element in a direction opposite the direction of rotation to move the lock bolt to the unlocking position, thereby moving the lever arm to the disengaged position. The lever arm moving to the disengaged position releases the selective engagement, thereby rotating the blocker member in the biasing direction back to the first position. The method also provides reengaging the selective engagement when the blocker member is in the first position.

A method of providing sufficient electricity to a motor operating a lock is also provided according to an exemplary embodiment of the invention. The method provides generating electricity upon manual actuation of a manually operable electricity generator by a user and storing the generated electricity with a first electricity storage device. Furthermore, the method provides determining a required amount of electricity to operate the motor via a controller and supplying electricity to the motor from the first electricity storage device according to the required amount.

A method of preventing an automated device from inputting a correct lock combination of a lock is provided in accordance with another exemplary embodiment of the invention. The method provides sensing the rotation of a lock dial with a sensor and communicating sensed rotation from the sensor to a controller. Furthermore, the method provides determining whether the lock dial is being rotated with the automated device via the controller. Accordingly, when the controller determines that the lock dial is being rotated with the automated device, the controller maintains the lock in a locked position regardless of inputting the correct lock combination.

A further exemplary embodiment of the invention provides a method of powering a lock having a manually operable electricity generator electrically connected to a motor and a display device. The method provides generating electricity upon manual actuation of the electricity generator and supplying electricity generated by the electricity generator to the motor for operating the lock. The method also provides supplying electricity generated by the electricity generator to the display device for displaying information regarding the lock to a user.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

Figure 1:
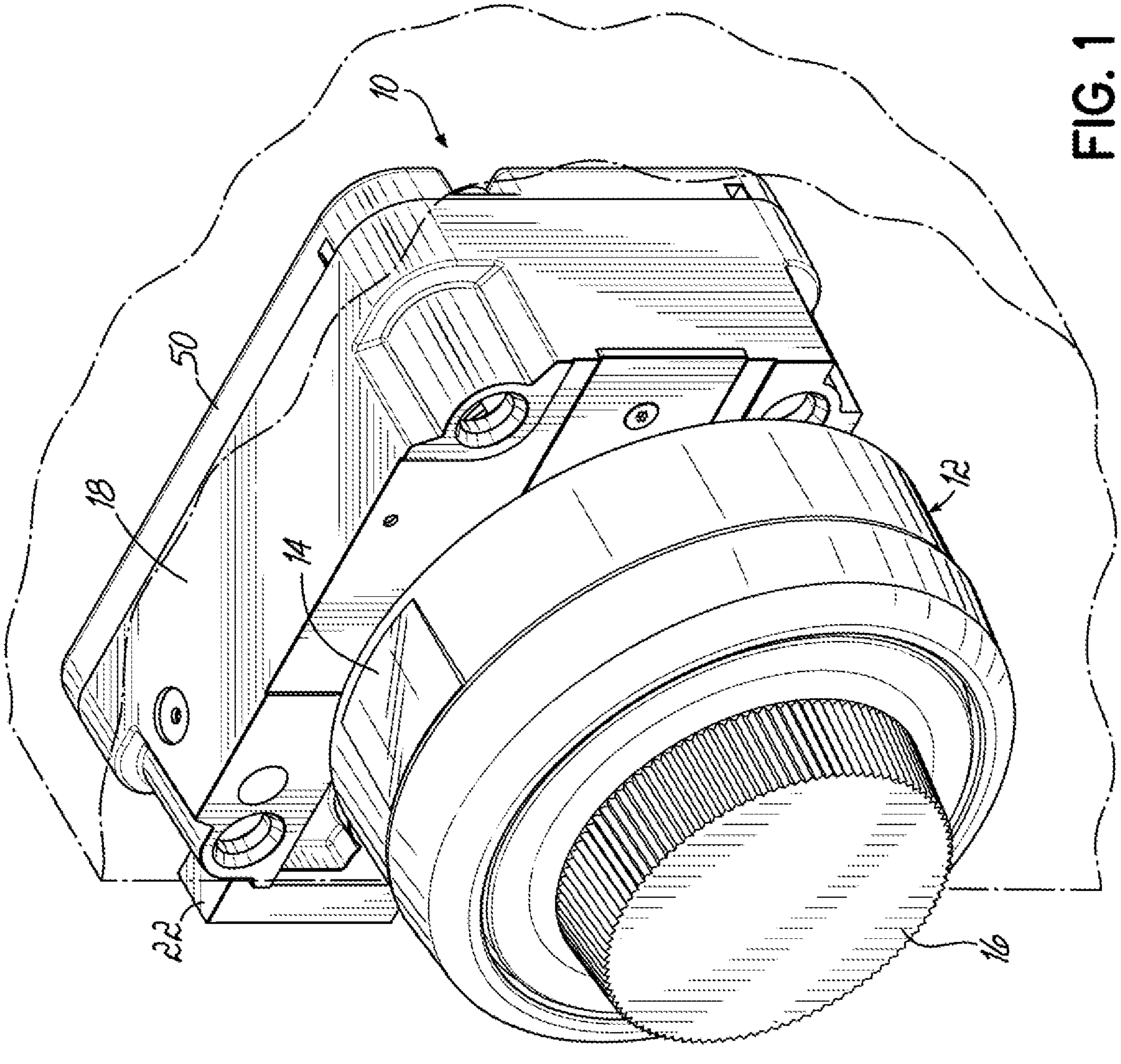
FIG. 1 is a perspective view of an exemplary device having a generally rectangular casing according to the invention.

As best seen in FIG. 1, a device 10 for preventing unwanted opening of a locked enclosure according to a preferred embodiment of this invention has an external user-accessible hub 12 conveniently provided with a display 14 and a manually rotatable combination input knob or dial 16. Hub 12 is attached to the casing 18 in any known manner. Alternatively, there may be an access apparatus such as a door disposed between the hub 12 and a casing 18.

Figure 2:
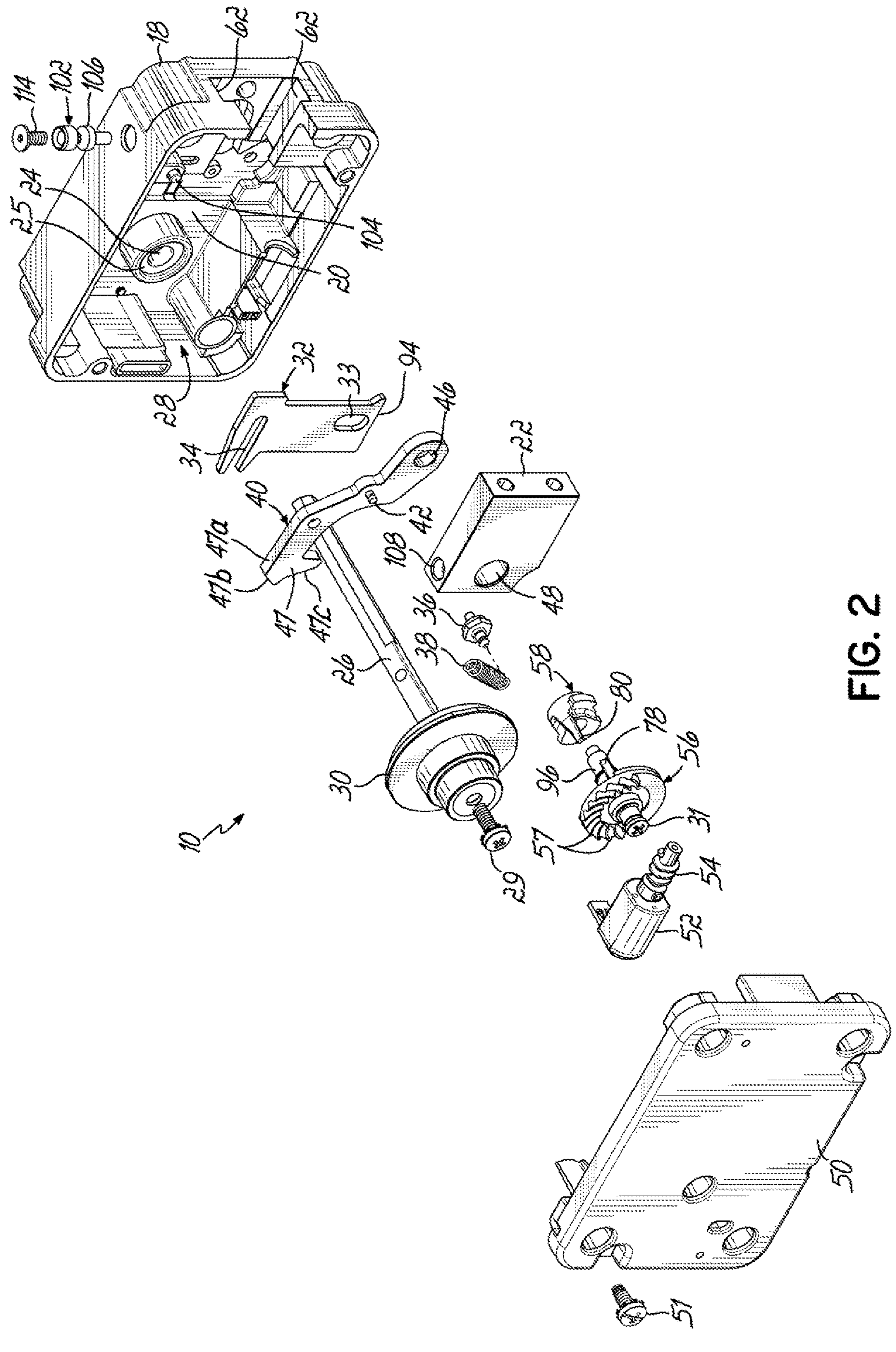
FIG. 2 is an exploded perspective view of the device of FIG. 1 as viewed from a location behind a casing of the device.

FIG. 2 is an exploded view of the device 10 for preventing unwanted opening of a locked enclosure according to a preferred embodiment of this invention, as viewed in looking toward the inside surface 20 of casing 18. Persons of ordinary skill in the art can be expected to appreciate that the device 10 can be mounted on a variety of access apparatuses, such as doors, on a variety of enclosures, such as safes, rooms, structures, and any other enclosure where it is desired to protect the contents from unintended access by locking the enclosure. Moreover, it is not critical to the utility of the present invention that device 10 be mounted to a door since, without difficulty, the device 10 can be easily mounted to a wall of an enclosure in such a manner that a lock bolt 22 projects in its locking position into the door, rather than the enclosure, to lock it to the body of the enclosure.

An aperture 24 extends through the entire thickness of casing 18 to closely accommodate therein shaft 26 extending from combination-input knob 16 (see FIG. 1) into a space 28 defined inside casing 18. In casing 18, there is provided an annular journal bearing 25 to closely receive and rotatably support shaft 26 via rotary element 30 projecting therethrough and into space 28.

A sliding member 32 is provided which has a cam notch 34 at a superior portion, and a flat bottom portion 94 at the bottom end. The sliding member 32 includes an elongate aperture 33. The elongate aperture 33 provides clearance for a case stud 36 which is affixed to the casing 18 and coupled to an extension spring 38. The spring 38 couples to a lever arm 40 at a lever stud 42 by case stud 36. As discussed below in more detail, lever arm 40 includes a lateral pin 44 (see FIGS. 5A-5F) that travels within cam notch 34 of sliding member 32. The lever arm 40 includes a circular aperture 46 at one end and a hook 47 at the other end. The hook 47 has contiguous portions 47*a*, 47*b* and 47*c*. The lock bolt 22 has a pin (not shown) which receives the end of the lever arm 40 having the circular aperture 46 whereat the lever arm 40 is pivotably fixed such that the circular aperture 46 is situated concentrically relative to a pivot mounting aperture 48 of the lock bolt 22. The lever arm 40 is pivotable to engage with a mechanical detent or recess 66 (see FIGS. 5A-5F) of the rotary element 30, as explained below in further detail.

Figure 3:
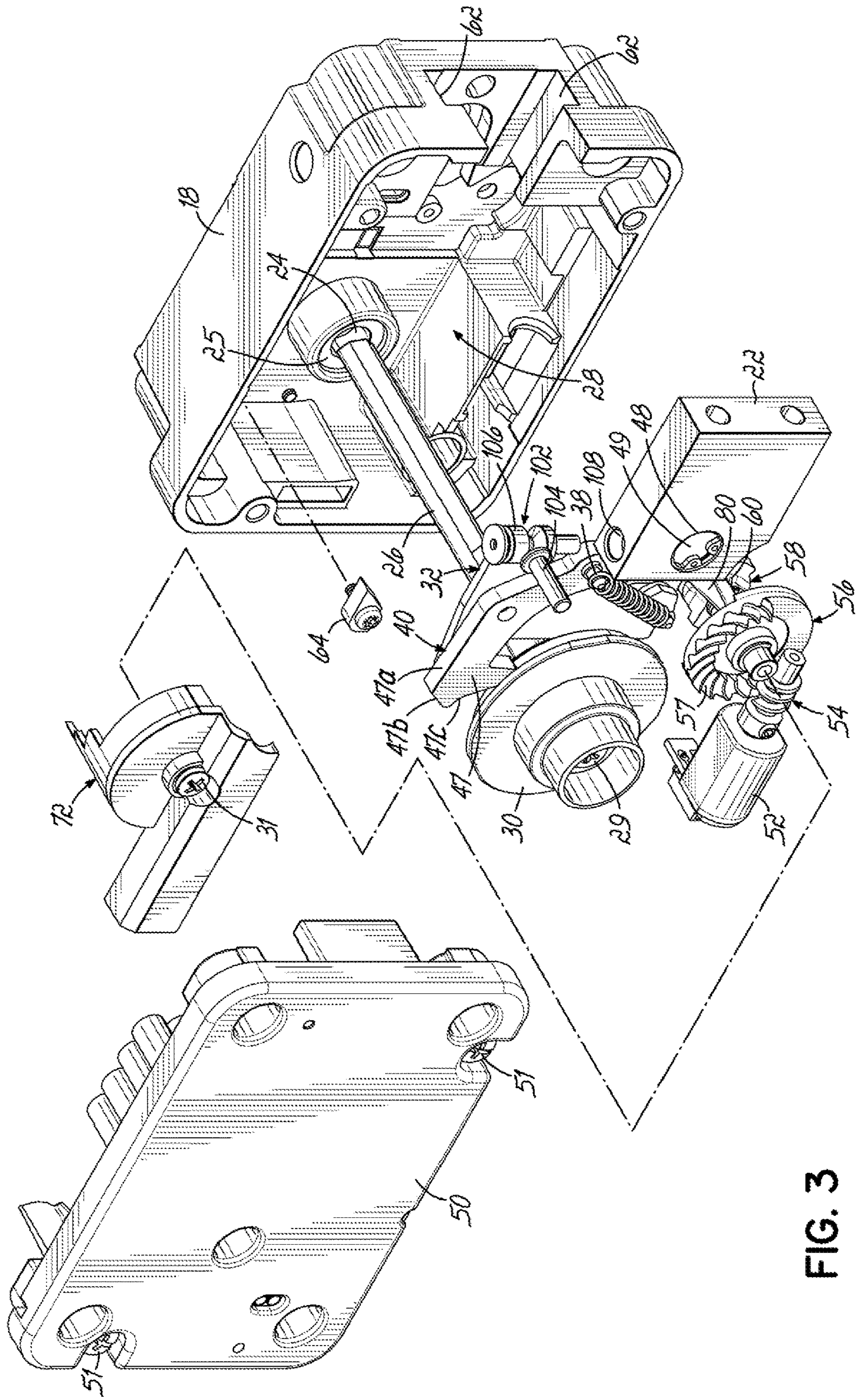
FIG. 3 is an exploded perspective view of the device of FIG. 1 as viewed from a location behind a casing of the device showing the interaction of various elements.
Figure 4:
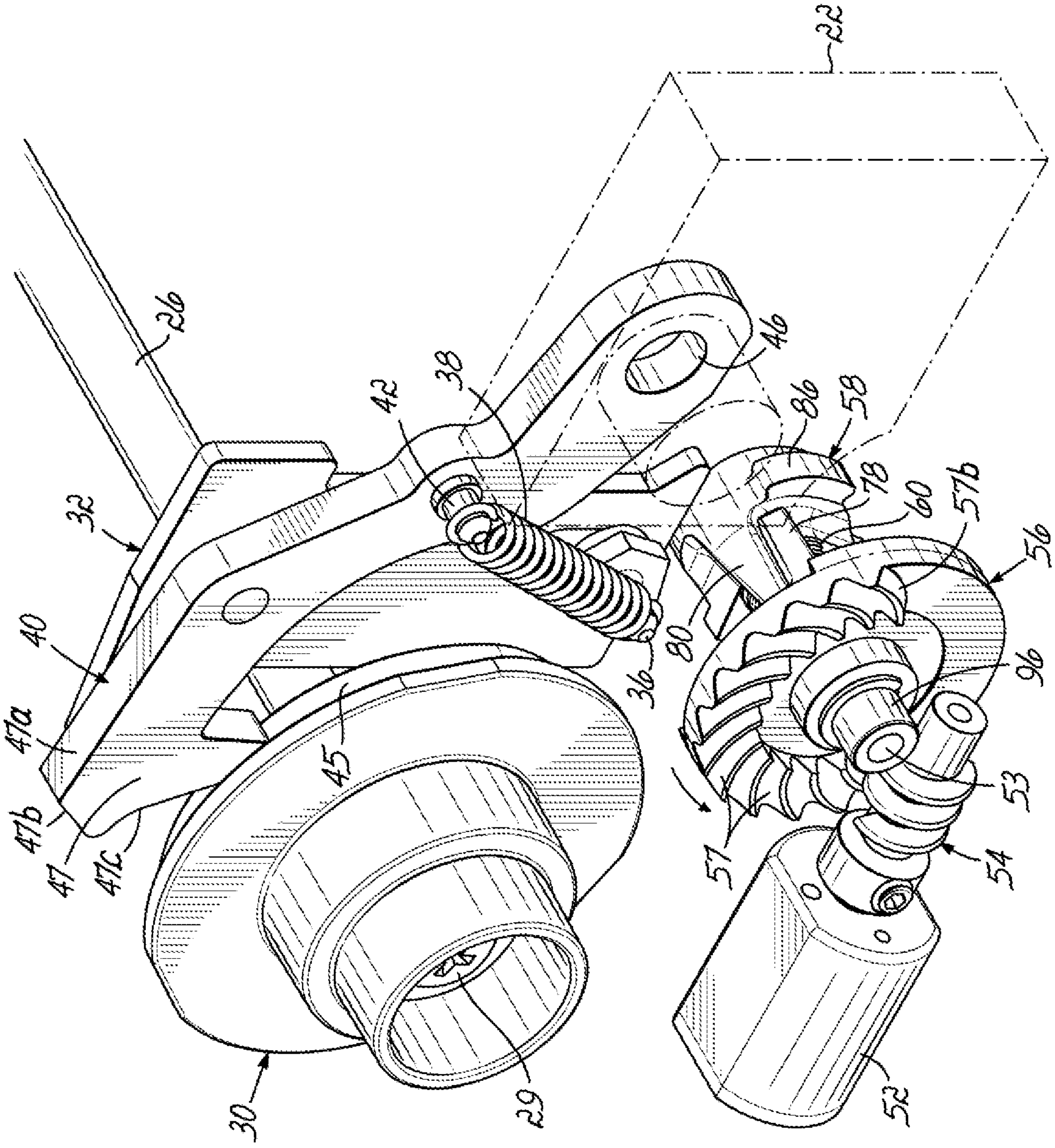
FIG. 4 is an enlarged perspective view of FIG. 3.

As seen in FIGS. 3-4, a shaft 26, rotatable by knob 16 (see FIG. 1), extends into casing 18. The lock bolt 22 is slidably supported by casing 18 to be projected outwardly into a locking position, or to be retracted substantially within casing 18 to an unlocking position, upon appropriate manual operation of combination-input knob 16 (see FIG. 1) by a user. Casing 18 is provided with a detachable back wall 50, fixed to the remaining portion of casing 18 by fasteners 51, which also serve to provide support to various components of the device 10 according to this invention.

A motor 52 and a worm gear 54 are provided. The worm gear 54 is meshable with and rotates a face gear 56. A blocker member 58 is operatively coupled to the face gear 56 by a torsion spring 60, the interaction of which is explained in more detail below with respect to FIGS. 7A-7G. As further shown in FIGS. 3-4, shroud 72 envelops the motor 52, worm gear 54 and face gear 56 (see FIG. 3). Fastener 31 engages with aperture 53 in a shaft 96 in order to fix the shroud 72 relative to the shaft 96 and thereby the casing 18. Shroud 72 assists in maintaining the position of motor 52 and also provides protection against access to the motor 52 and worm gear 54 through the back wall 50.

Casing 18 is conveniently formed, e.g., by machining, molding or in an otherwise known manner, to provide a pair of guide slots 62 which are shaped, sized and disposed to closely accommodate lock bolt 22 in a sliding motion between its locked and unlocked positions. While an important object of this invention is to provide its locking function in a highly compact manner, the casing 18, lock bolt 22 and guide slots 62 are also shaped and sized to provide the necessary strength to resist any foreseeable brute-force to open the locked enclosure. For example, although the locked enclosure may be made of highly tempered steel or alloy, the lock bolt 22 and other elements of the lock may be made of a softer metal, such as brass, or an alloy, such as "ZAMAK." However, it will be appreciated by persons of ordinary skill in the art that other known materials may be suitable for forming one or more elements of the lock.

Lock bolt 22 is provided with the pivot mounting aperture 48 into which is mounted a pivot 49, to pivotably connect the lever arm 40 to lock bolt 22. Thereby, the pivot 49 and lever arm 40 communicate a manual force for moving the lock bolt 22 along the guide slots 62 between locked and unlocked positions.

Lever arm 40 is provided with the lateral pin 44 (see FIGS. 5A-5F) disposed to be engaged by cam notch 34 (see FIG. 2) of sliding member 32 so as to be forcibly moved in conjunction with sliding member 32 caused to be slidingly moved as guided by the blocker member 58. The distal portion of lever arm 40 extending beyond the location of lateral pin 44 is formed as the hook 47, the shape of which is provided with an outside edge having the plurality of contiguous portions 47*a*, 47*b*, 47*c*. The contiguous portions 47*a*, 47*b*, 47*c* coact with a downwardly depending fixed cam portion 64 formed at an inside surface of casing 18. This coaction, at different stages in the course of moving lock bolt 22 between its locked and unlocked positions, is best understood with successive reference to FIGS. 5A-5D and is described more fully hereinbelow.

As shown in FIG. 3, an end portion of shaft 26 which extends into casing 18, preferably has a square cross-section, to which is mounted the rotary element 30 via the matchingly shaped and sized central fitting aperture 24 (see FIG. 2). Accordingly, when the user of the safe manually applies a torque to the combination-input knob 16 (see FIG. 1), torque transmits to shaft 26 to thereby forcibly rotate rotary element 30. Fastener 29 fixes the rotary element 30 relative to the shaft 26. A split ring (not shown), for example, may be utilized to retain the rotary element 30 to shaft 26 in a known manner. Other known techniques or structures for retaining the rotary element 30 may be used. By this arrangement there is readily available, through rotary element 30, a manually provided torque at a point inside space 28 of casing 18, i.e., within the secure containment space 28 inside a locked enclosure.

FIG. 4 shows the configuration of the device 10 when the face gear 56 is in the first position and the interaction between the rotary element 30, sliding member 32, lever arm 40, motor 52, worm gear 54, face gear 56, and blocker member 58. As described herein, the electricity is provided to the motor 52, whereby the motor 52 drives the worm gear 54 in a first direction to rotate the face gear 56 in a counterclockwise direction (as viewed from a front view as shown in FIGS. 7A-7G) from the first position, i.e., FIGS. 4, 5A, 6A, to the second position, i.e., FIGS. 5B, 6B. The blocker member 58 is disposed rearwardly relative to the face gear 56 and operatively coupled to the face gear 56 via the biasing member 60. The interaction between the face gear 56, blocker member 58 and biasing member 60 is described fully hereinbelow. The sliding member 32 is operatively coupled to the lever arm 40 such that when the lever arm 40 moves upwardly and downwardly, the sliding member 32 also moves upwardly and downwardly. The position of the sliding member 32 is dependent upon the rotation of the rotary element 30 and the position of blocker member 58. At a certain point of rotation, the lever arm 40 may engage with the recess or mechanical detent 66 (see FIGS. 5A-5F) of the rotary element 30 in order to move downwardly. The downward movement of the lever arm 40 urges the sliding member 32 downwardly. The downward movement of the sliding member 32 is limited by the rotational position of the blocker member 58. The interaction between the rotary element 30, sliding member 32, lever arm 40 and the blocker member 58 is described in more detail below.

Figure 5A:
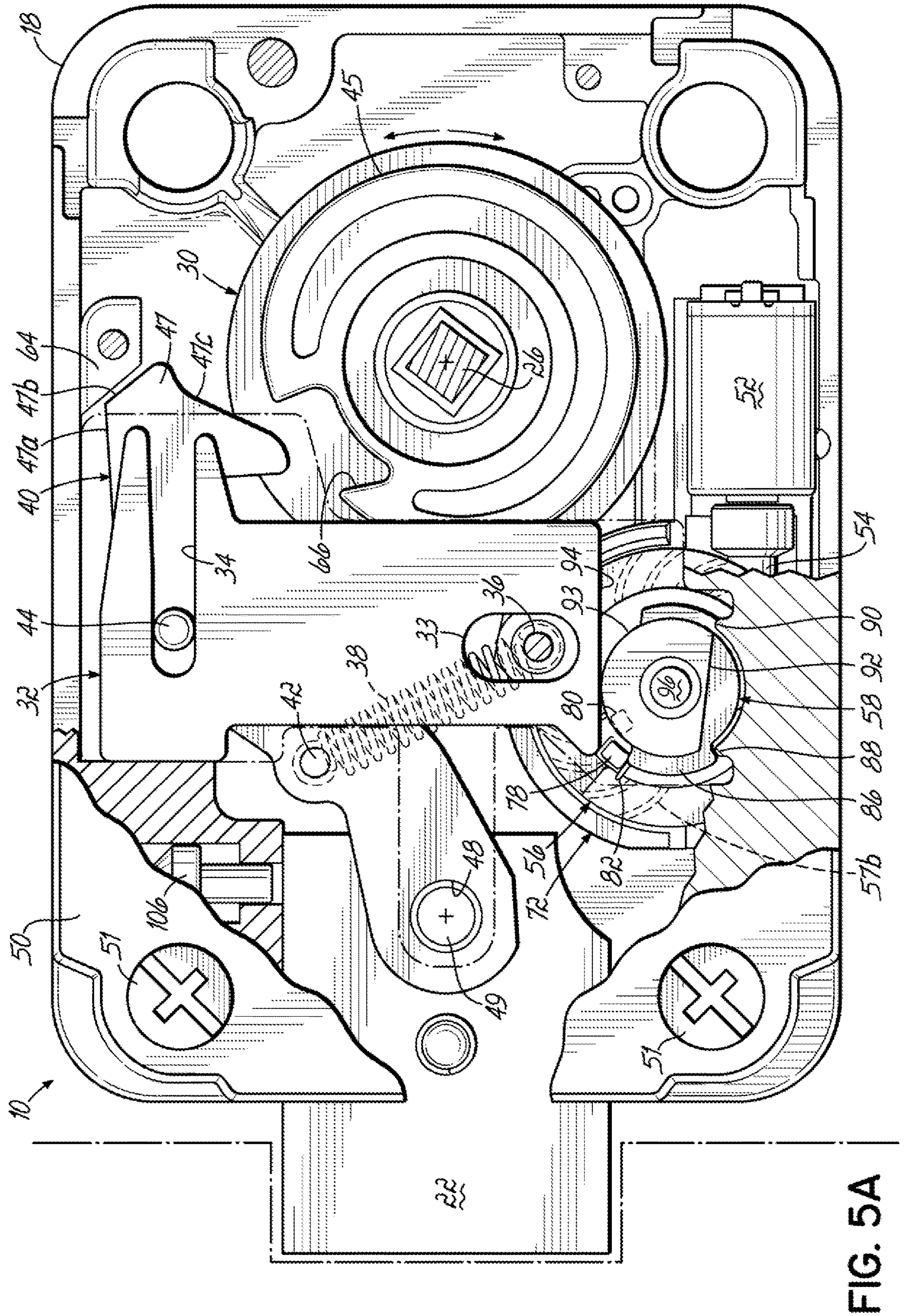
FIGS. 5A-5F are back plan views that are partially broken away showing the device of FIG. 1 and coaction of a variety of elements at various stages as a lock bolt moves between locked and unlocked positions.
Figure 5B:
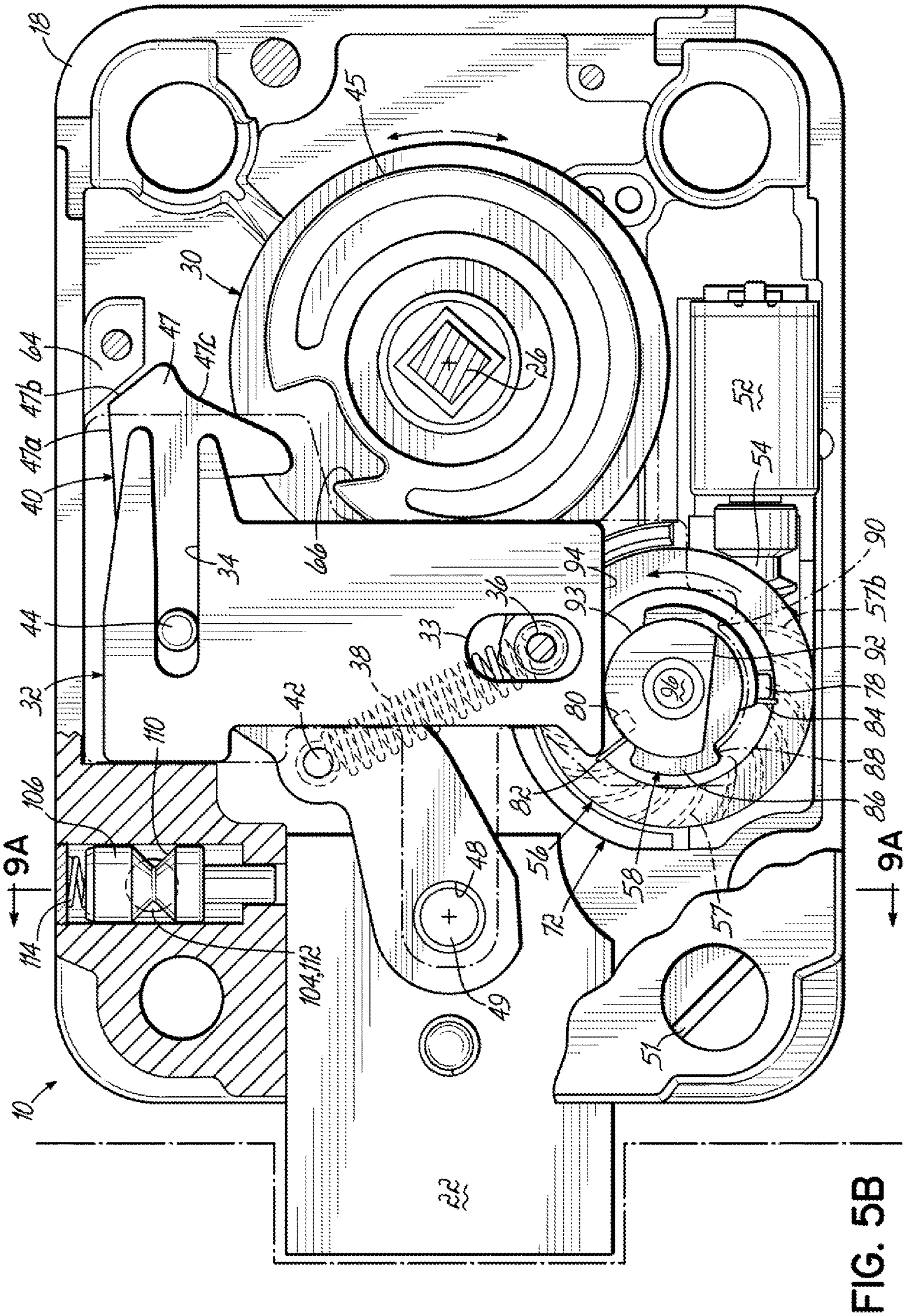
Figure 5C:
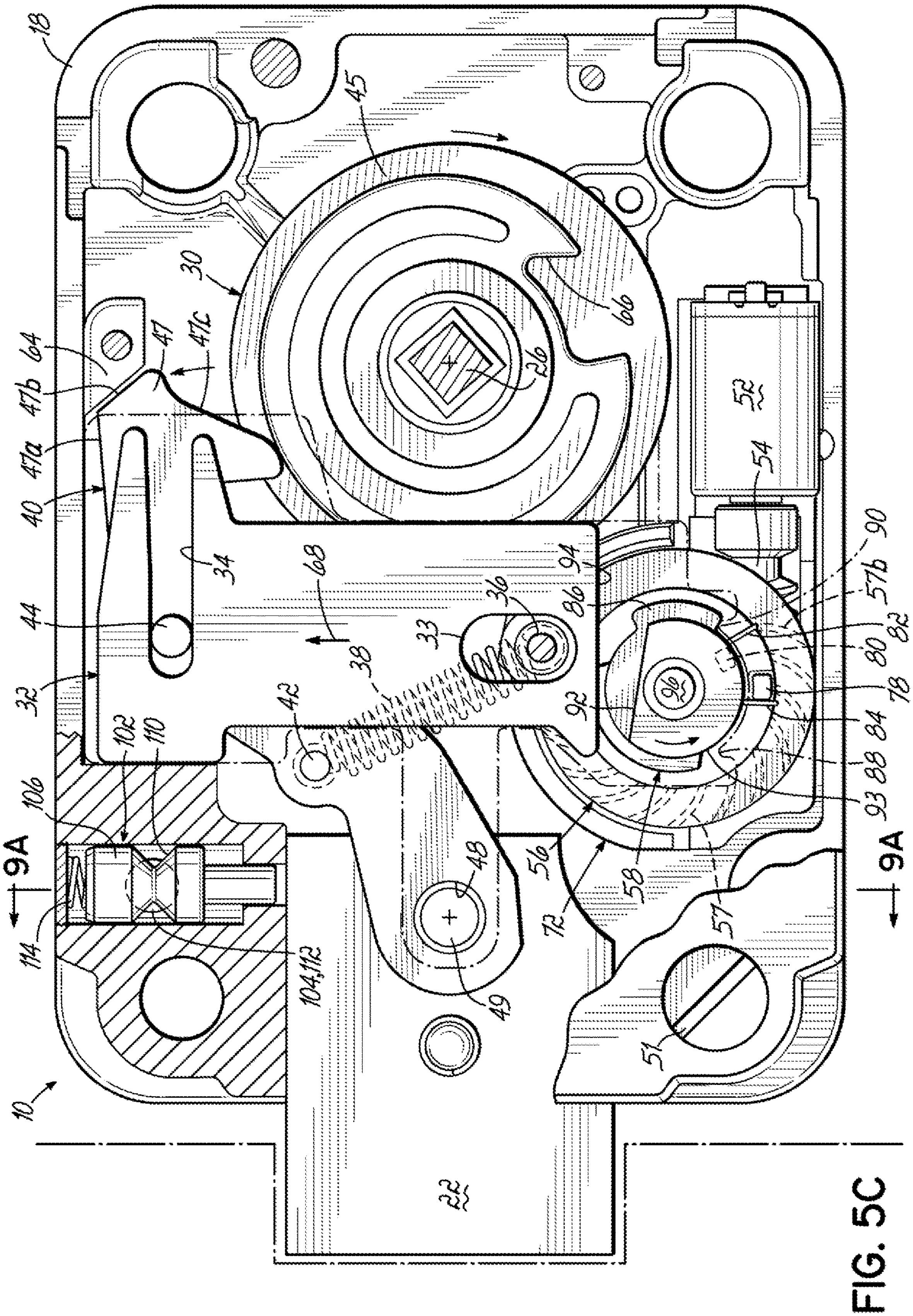
Figure 5D:
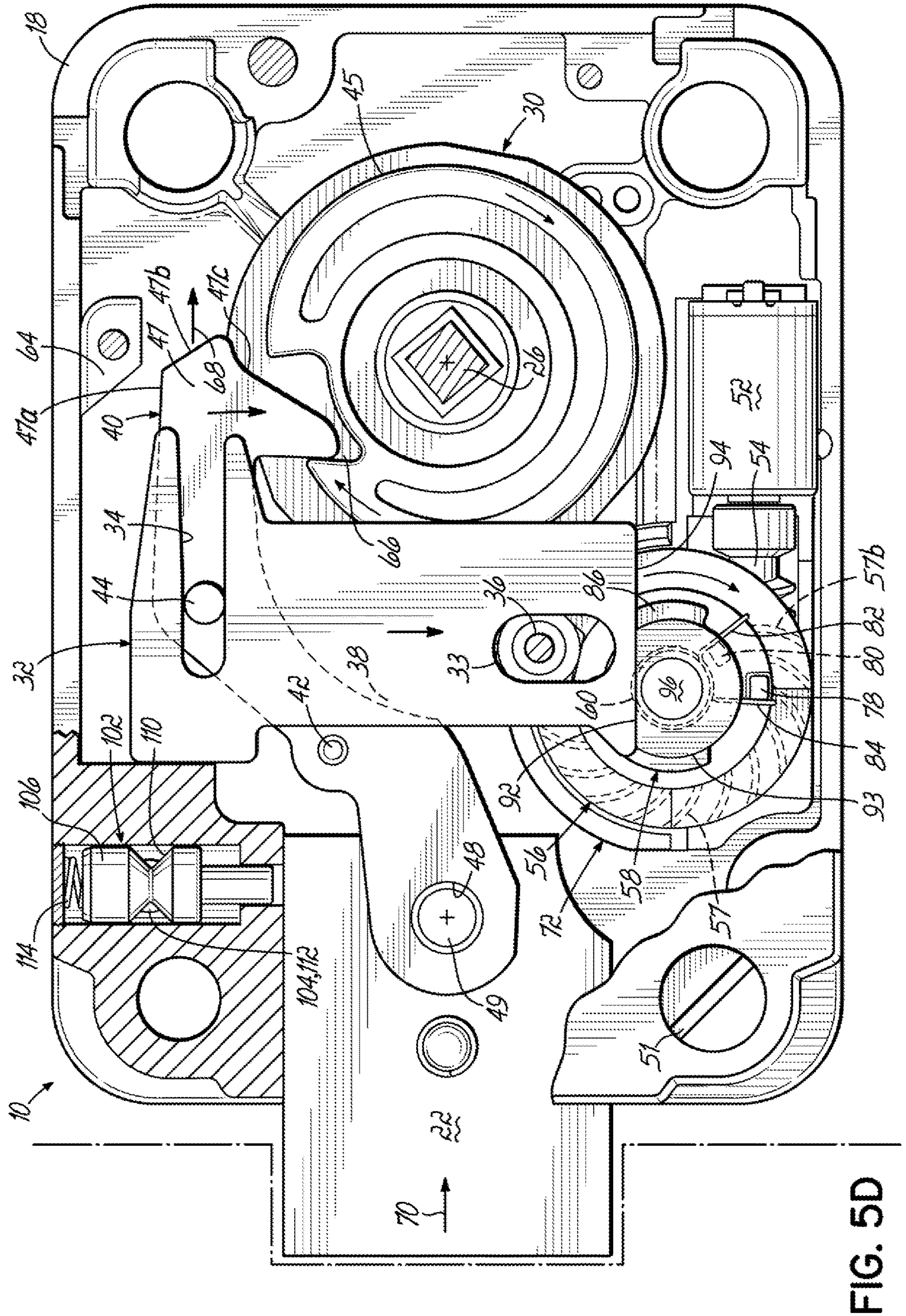

As shown in FIG. 5A, the lever arm 40 is in the disengaged position, unable to move downwardly to thereby engage with the mechanical detent 66 provided on rotary element 30. When the blocker member 58 is in the second position, the sliding member 32 has the freedom to move further down. In addition, because of the manner of coupling with lever arm 40, the hook 47 of lever arm 40 is allowed to move under the load from extension spring 38 into the engageable position with recess 66 of rotary element 30. As the rotary element 30 is rotated clockwise (as viewed from a back view as shown in FIGS. 5A-5F) when the lever arm 40 is in the disengaged position as shown in FIG. 5C, the hook 47 of the lever arm 40, under loading from extension spring 38, interacts with a cam surface 45 of rotary element 30. In turn, the lever arm 40 raises and the sliding member 32 moves in an upwards direction as indicated by arrow 68. This allows the blocker member 58 to rotate to an unlocking position. When the lever arm 40 moves to the engageable position (see FIG. 5D), the hook 47 of the lever arm 40 interacts with cammed surface 45 of the rotary element 30 in a cammed relationship until the user rotates the rotary element 30 to the point where the hook 47 may engage the mechanical detent 66 of the rotary element 30, as shown in FIG. 5D. The movement of the lever arm 40 into the engageable position depends on the position of the sliding member 32 relative to the blocker member 58.

Specifically, cam notch 34 at the upper distal end of sliding member 32 engages with lateral pin 44 of lever arm 40. As shown in FIGS. 5A-5D extension spring 38 keeps a biasing force on the lever arm 40 in the downward direction. The coupling described above between lever arm 40 and sliding member 32 ensures that sliding member 32 follows the vertical movement of lever arm 40 but, due to the interaction between sliding member 32 and blocker member 58, that range of motion is restricted when the blocker member 58 is in the locking position. Because of the limited range of motion of lever arm 40 when the blocker member 58 is in the locking position, the hook 47 of lever arm 40 will only make contact with a portion of the cam surface 45 of rotary element 30. This is done in order to raise the sliding member 32 and release pressure off the blocker member 58, thereby allowing the blocker member 58 to move under any biasing load caused by the torsion spring 60 and the particular orientation of the face gear 56. Once the blocker member 58 is in the unlocking position, the hook 47 of lever arm 40 is free to follow all portions of cam surface 45. When the hook 47 reaches the recess 66, from external input rotation of the rotary element 30, it will positively engage with the recess 66 as shown in FIG. 5D.

Figure 5E:
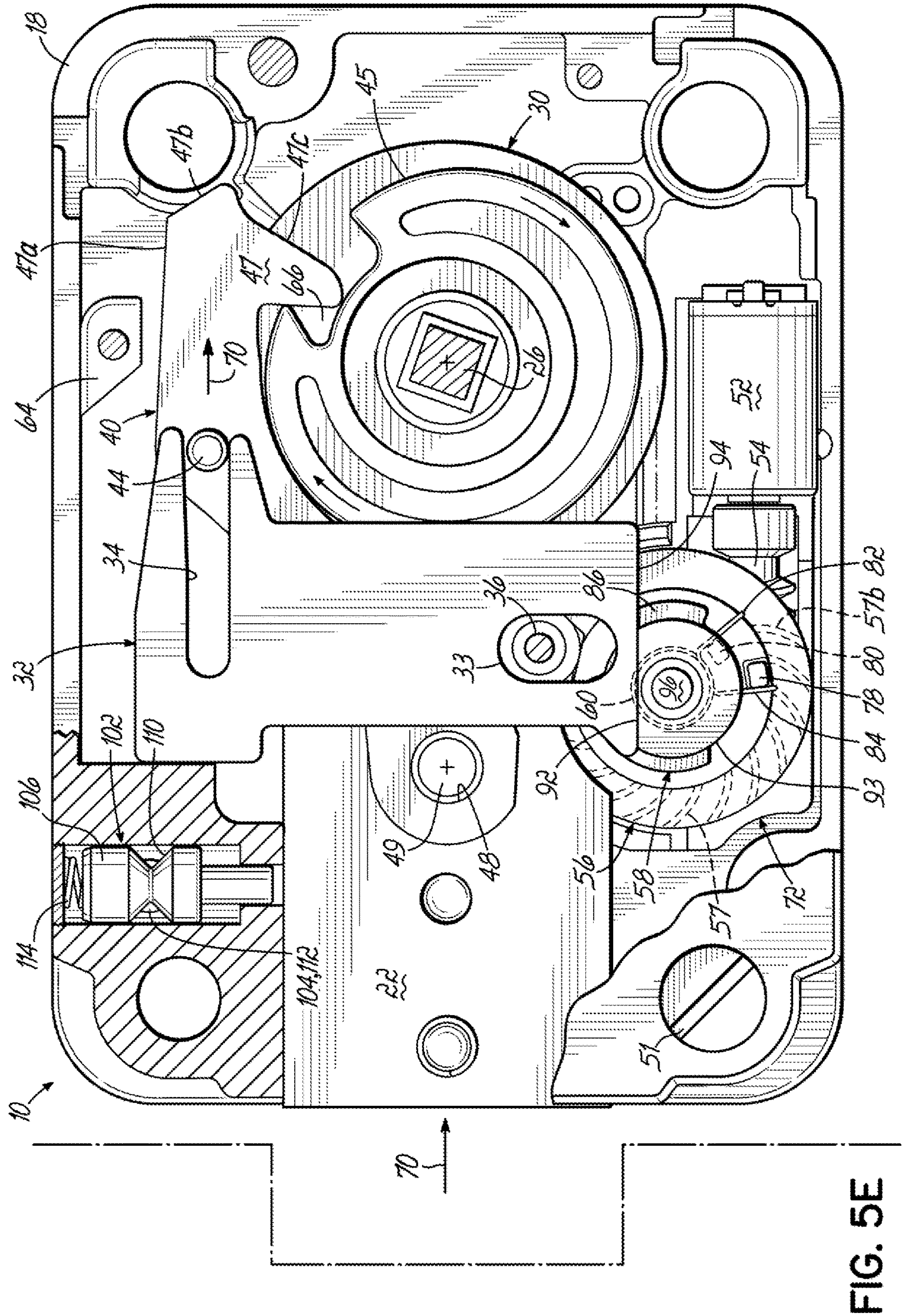
Figure 5F:
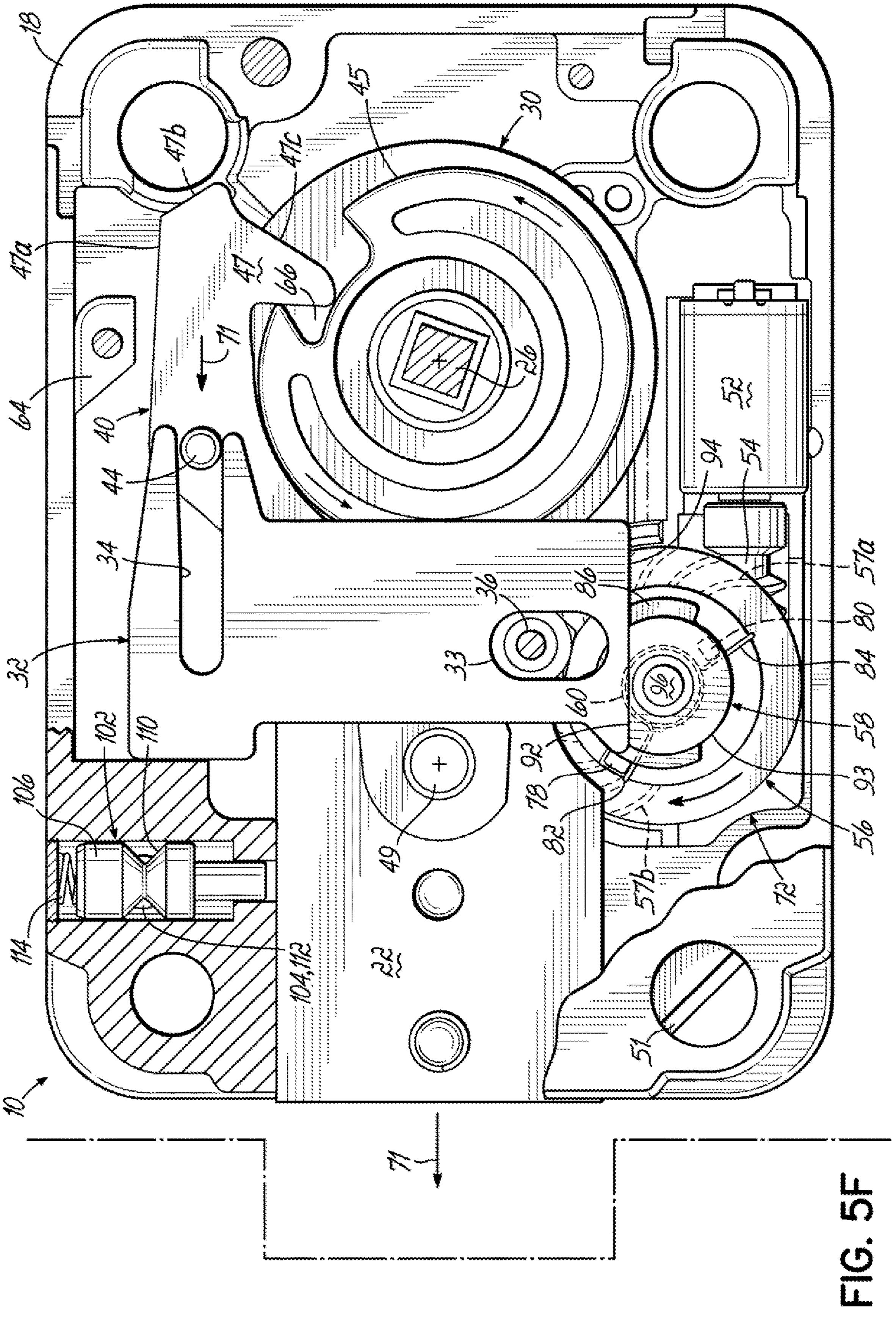

More specifically, force transmitting through the sliding member 32, the fixed cam portion 64, the outside edge portions 47*a*, 47*b*, 47*c* of lever arm 40, and the hook 47 with mechanical detent 66 leads to a manually-provided force being transmitted to forcibly draw lock bolt 22 into casing 18 in the direction of arrows 70 as shown in FIG. 5E. Ultimately, lock bolt 22 becomes substantially drawn into casing 18 to its unlocked position. As shown in FIG. 5F, when the user desires to move the lock bolt 22 back to the locked position from the unlocked position, the user may rotate the lock dial 16 (see FIG. 1) to rotate the rotary element 30 in the counterclockwise direction. The counterclockwise rotation causes the lever arm 40 to move in the direction as indicated by arrows 71 and to eventually disengage from the recess 66 of the rotary element 30. This movement of the lever arm 40 moves the lock bolt 22 back to the locked position, wherein the lock bolt 22 is extending at least partially out of the casing 18. Depending on the rotational position of the rotary element 30 relative to the hook 47, after the user rotates the lock dial 16 (see FIG. 1) in the counterclockwise direction to move the lock bolt 22 to the locked position, the lever arm 40 and sliding member 32 will essentially be configured as shown in FIGS. 5A-5B.

Figure 6A:
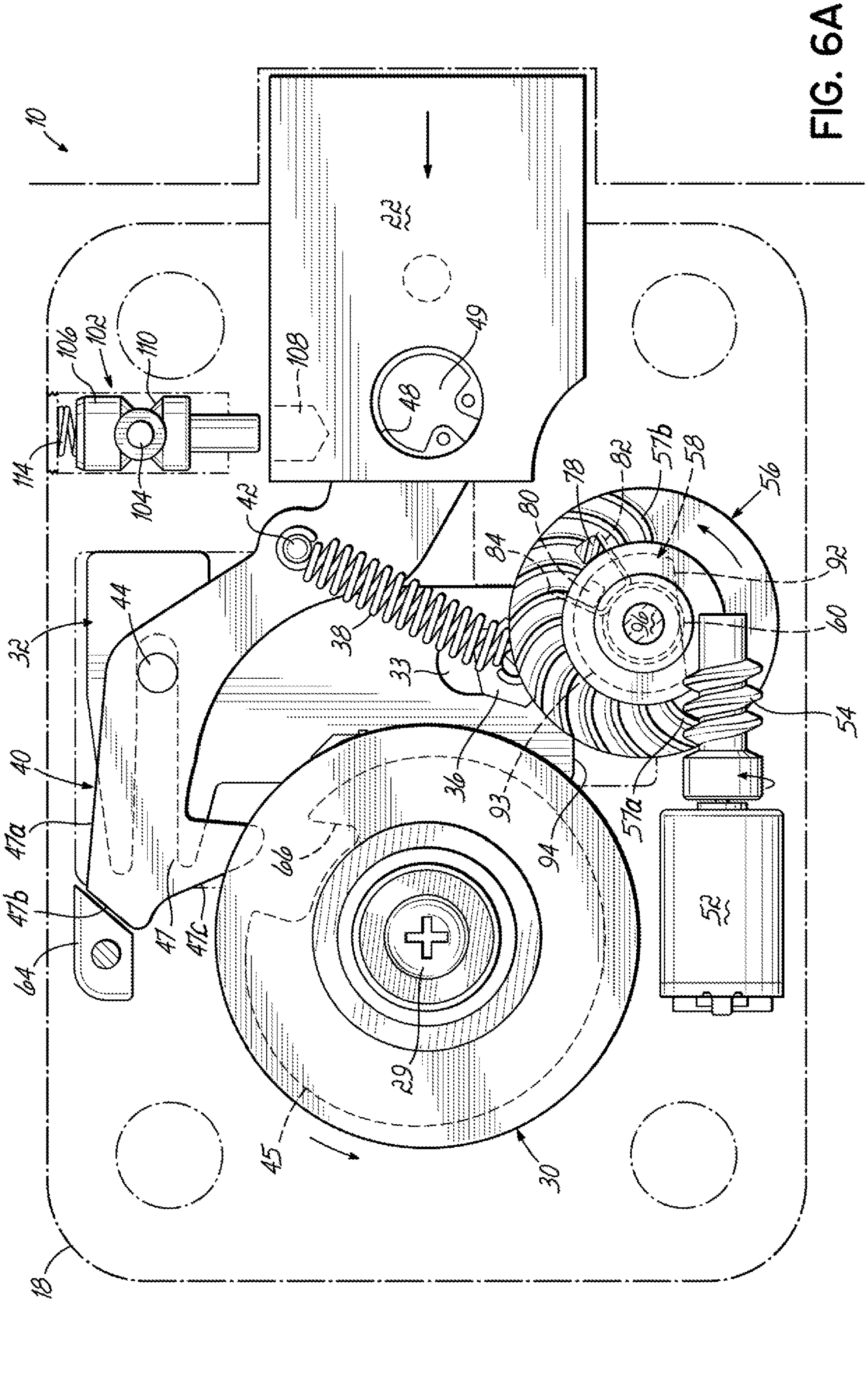
FIGS. 6A-6D are front plan views showing the device of FIG. 1 and coaction of a variety of elements at various stages as the lock bolt moves between locked and unlocked positions.
Figure 6B:
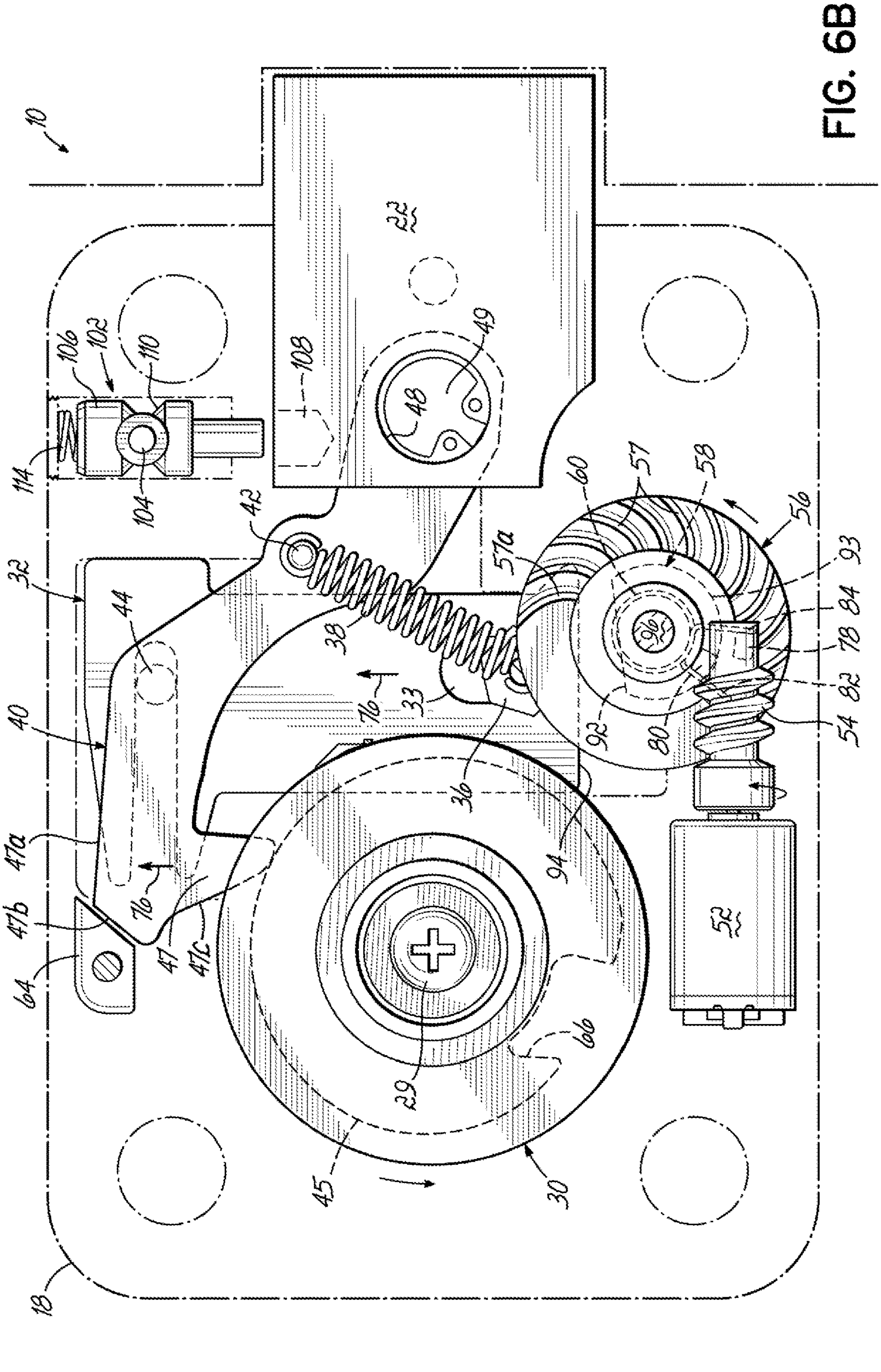

FIGS. 6A-6D show the functionality of the device 10 from a front side view. Descriptions of directions such as clockwise and counterclockwise with respect to these FIGS. 6A-6D should be understood to be relative from this front view. As shown in FIG. 6A, the lever arm 40 is in the disengaged position and unable to engage with the mechanical detent or recess 66 (shown in hidden lines) of the rotary element 30. In this configuration, the lock bolt 22 is in the locked position and is extending at least partially out of the casing 18. The face gear 56 is in the first position and the blocker member 58 (shown in phantom lines) is in a locking position. With reference to FIG. 6B the face gear 56 has been rotated to the second position by the worm gear 54. The rotation of the rotary element 30 by the user causes the end of the hook 47 of the lever arm 40 to interact with the cam surface 45 (shown in hidden lines) of rotary element 30. The interaction between the hook 47 and the cam surface 45 of rotary element 30 urges the lever arm 40 upwards. Due to the cam notch 34 at the upper distal end of sliding member 32 engaging with lateral pin 44 of lever arm 40, the upward movement of the lever arm 40 causes an upward movement of the sliding member 32, as shown by arrows 76.

Figure 6C:
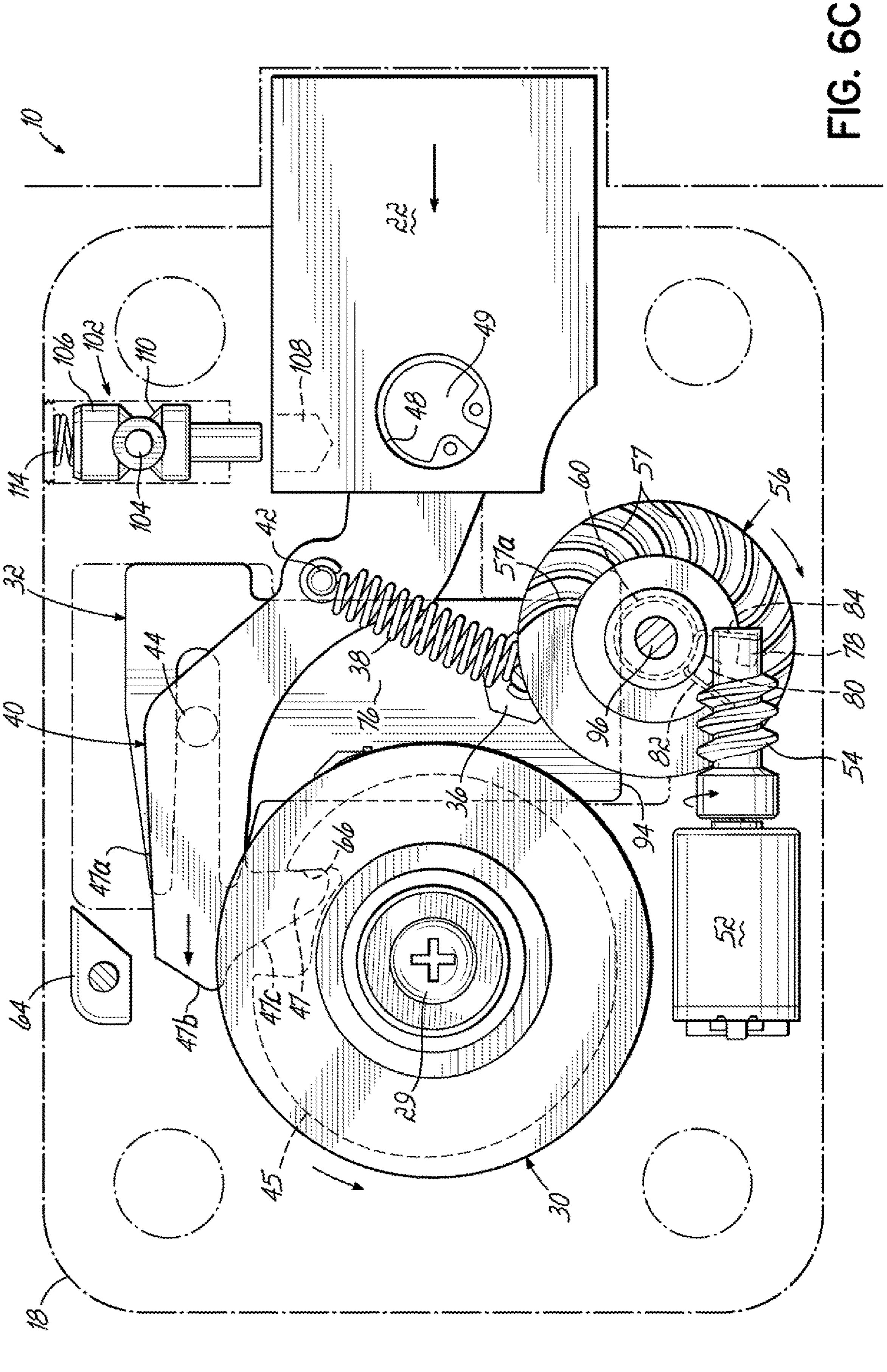

Referring to FIG. 6C, the face gear 56 remains in the second position. As rotary element 30 has been even further rotated in the counterclockwise direction, hook 47 of lever arm 40 engages with the recess 66 of the rotary element 30. This engagement is caused by the biasing load of extension spring 38, and the downward movement of both the lever arm 40 and the sliding member 32 is allowed because the blocker member 58 is in the second position as described above with respect to FIGS. 5A-5E. However, the downward movement of the sliding member 32 is limited by the position of the blocker member 58, as described below with respect to FIGS. 7A-7G.

Figure 6D:
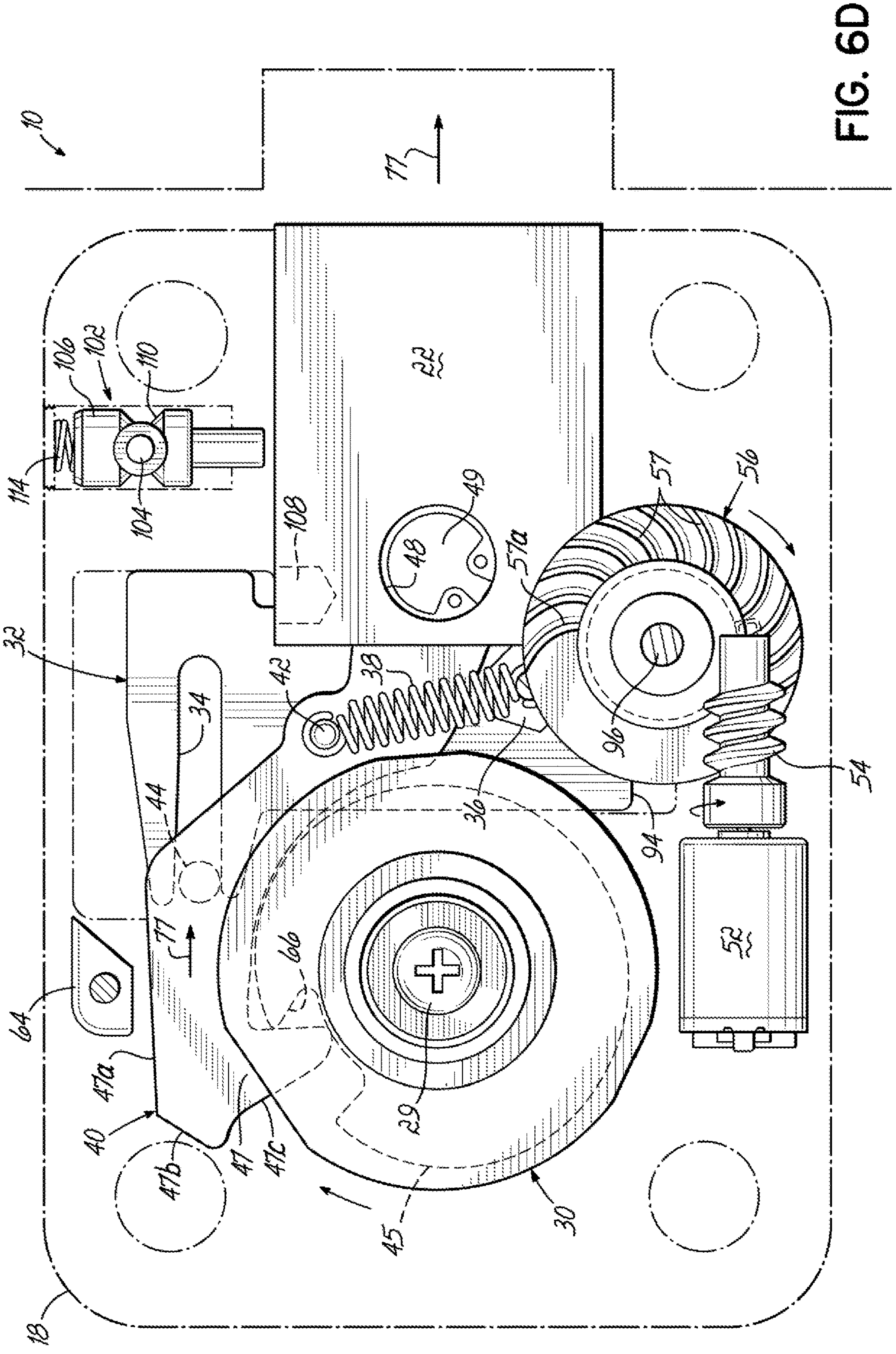

As shown in FIG. 6D, when the user desires to move the lock bolt 22 back to the locked position from the unlocked position, the user may rotate the lock dial 16 (see FIG. 1) and, in turn, rotate the rotary element 30 in the clockwise direction. The clockwise rotation causes the lever arm 40 to move in the direction as indicated by the arrows 77 and to eventually disengage from the recess 66 of the rotary element 30. This movement of the lever arm 40 moves the lock bolt 22 back to the locked position, wherein the lock bolt 22 is extending at least partially out of the casing 18. Depending on the rotational position of the rotary element 30 relative to the hook 47, after the user rotates the lock dial 16 (see FIG. 1) in the clockwise direction to move the lock bolt 22 to the locked position, the lever arm 40 and sliding member 32 will essentially be configured as shown in FIGS. 6A-6B.

Figure 7A:
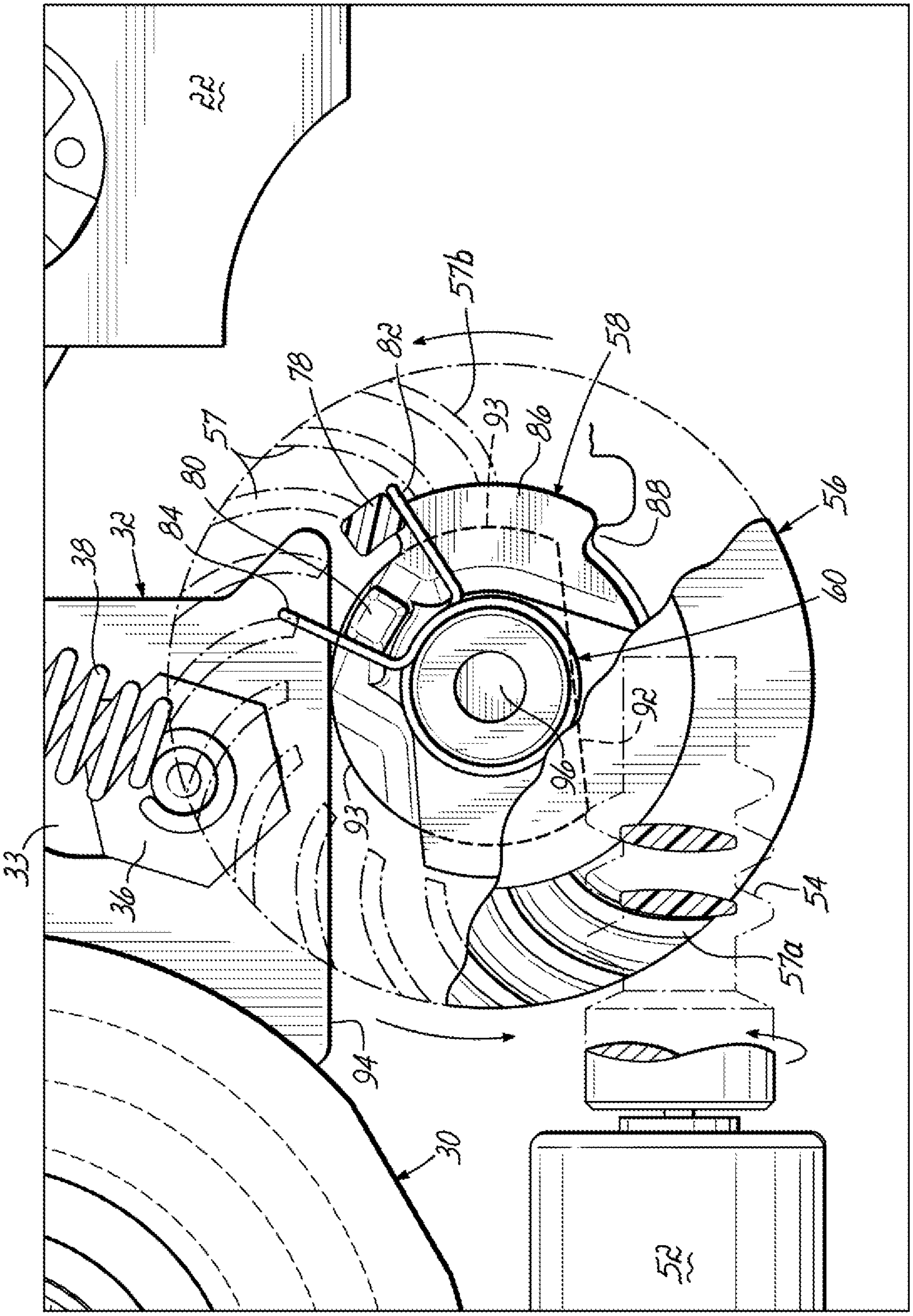
FIGS. 7A-7G are front plan views showing the device of FIG. 1 and coaction of a variety of elements at various stages as the lock bolt moves between locked and unlocked positions.

FIGS. 7A-7G show a front view of the detailed functionality of the face gear 56, blocker member 58 and torsion spring 60. Descriptions of directions such as clockwise and counterclockwise with respect to FIGS. 7A-7D should be understood with respect from this front view. FIG. 7A shows the face gear 56 in a first position and the blocker member 58 in a locking position. The blocker member 58 is operatively coupled to the face gear 56 by a biasing member, preferably the torsion spring 60, such that the blocker member 58 rotates with the face gear 56 as described in more detail below. The face gear 56 has a first arm 78 protruding transversely from a rear side thereof (see FIG. 8). The blocker member 58 has a second arm 80 protruding transversely from a front side thereof and in a direction opposite of the first arm 78. The torsion spring 60 has first and second legs 82, 84. The spring 60 is installed such that the first arm 78 engages the first leg 82 and the second arm 80 engages the second leg 84 when the face gear 56 is in the first position and the blocker member 58 is in the locking position.

In the configuration as shown in FIG. 7A, the first leg 82 biases the first arm 78 in a counterclockwise direction and the second leg 84 biases the second arm 80 in a clockwise direction. The counterclockwise bias on the first arm 78, due to the engagement of the first leg 82, biases the face gear 56 in the counterclockwise direction. Specifically, in the first position, a first end tooth 57*a* of face gear 56 is biased against the worm gear 54 to maintain a mesh therebetween. Because the face gear 56 is a sector gear containing a plurality of teeth 57 along only a portion of the circumference thereof, the bias in the counterclockwise direction assists in maintaining a mesh between the worm gear 54 and the face gear 56 when the face gear 56 is in the locking position. Specifically, when the worm gear 54 threads have run off either end of the first end tooth 57*a* or a second end tooth 57*b* of the face gear 56, the mesh has been exited. The bias from torsion spring 60 is to promote the maintenance of mesh by a reentry or reengaging of the mesh between worm gear 54 and teeth 57 of face gear 56 when the motor 52 rotates the worm gear 54 in the appropriate direction. This configuration is particularly advantageous because it allows the motor 52 to overrun multiple rotations without a stall condition since, in a preferred embodiment, power is applied to the motor 52 during a fixed time interval. The configuration of first and second end teeth 57*a*, 57*b* relative to the torsion spring 60 is such that the amount of bias on the blocker member 58 when the blocker member 58 is in the locking and unlocking positions is controlled. The configurations of the sliding member 32, lever arm 40 and rotary element 30 that correspond with the positions of the worm gear 54, blocker member 58 and torsion spring 60 as shown in FIG. 7A are shown in FIGS. 5A and 6A.

Figure 7B:
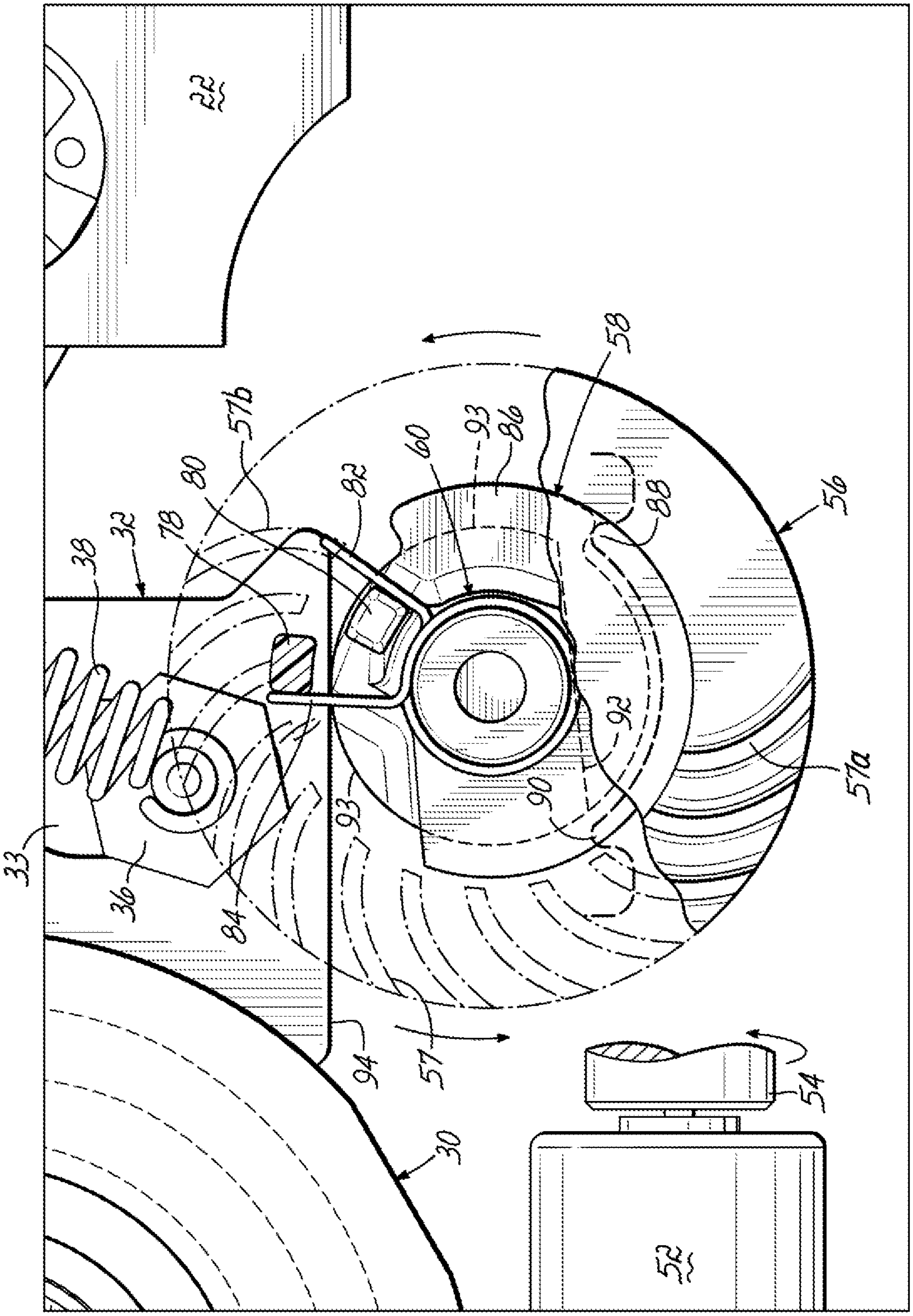

FIG. 7B shows the face gear 56 rotating counterclockwise from the first position to the second position. As the face gear 56 rotates, the first arm 78 rotates, thereby causing the first arm 78 to engage with the second leg 84. The engagement with the first arm 78 and the second leg 84 causes the rotation of the torsion spring 60 in the counterclockwise direction. Due to the counterclockwise rotation, the first leg 82 engages with the second arm 80. As the face gear 56 continues to rotate towards the second position, first arm 78 rotates therewith and also advances the second leg 84. The first leg 82 is prevented from further rotation due to the engagement of the first leg 82 with the second arm 80. The second arm 80 is prevented from rotation due to the frictional engagement between the flat bottom portion 94 of the sliding member 32 and a round cam section 93 of blocker member 58 which prevents the blocker member 58 from rotating in the counterclockwise direction. The further counterclockwise rotation of the face gear 56, resulting in the further rotation of the second leg 84 relative to the first leg 82 creates a bias on the second arm 80 and the blocker member 58 in the counterclockwise direction. As indicated by arrow 83, sliding member 32 selectively disengages from the blocker member 58 and moves in an upward direction relative to the blocker member 58. This upward movement of the sliding member 32 is due to the interaction of the sliding member 32 with the lever arm 40 and rotary element 30, as discussed with further detail with respect to FIGS. 5A-5F and 6A-6D.

Figure 7C:
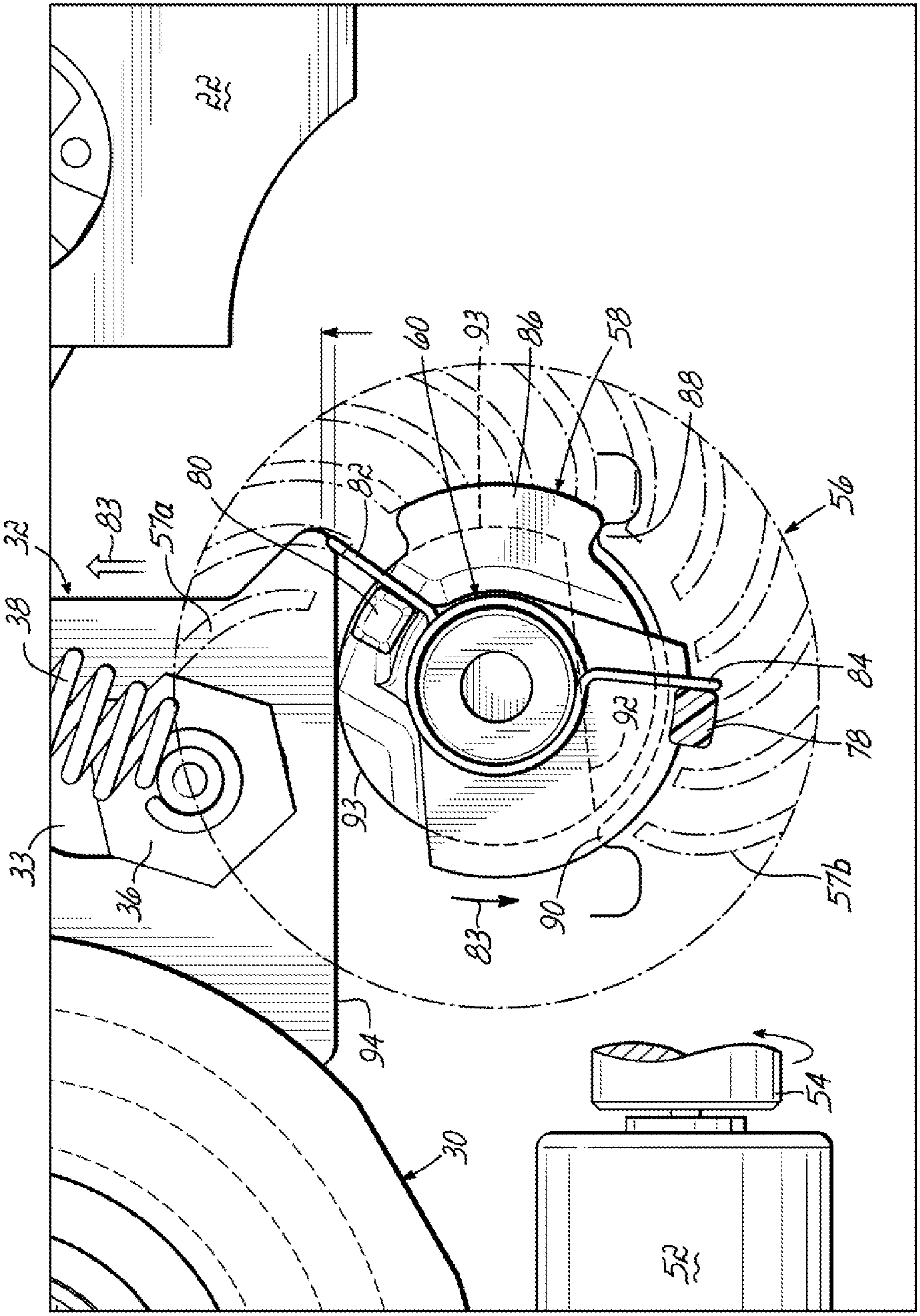

With reference to FIG. 7C, after the face gear 56 has rotated to the second position, due to the engagement of the second leg 84 and first arm 78, the second leg 84 creates a bias on the first arm 78 to rotate the face gear 56 in the clockwise direction. The clockwise bias on the face gear 56 assists in maintaining a mesh between the face gear 56 and worm gear 54 when the face gear 56 is in the second position. Specifically, in this configuration, second end tooth 57*b* of face gear 56 is biased against the worm gear 54 thereby maintaining a bias therebetween. More specifically, the spring bias from torsion spring 60 maintains a mesh between the second end tooth 57*b* and worm gear 54 by reengaging the mesh therebetween after a disengagement of mesh.

Figure 7D:
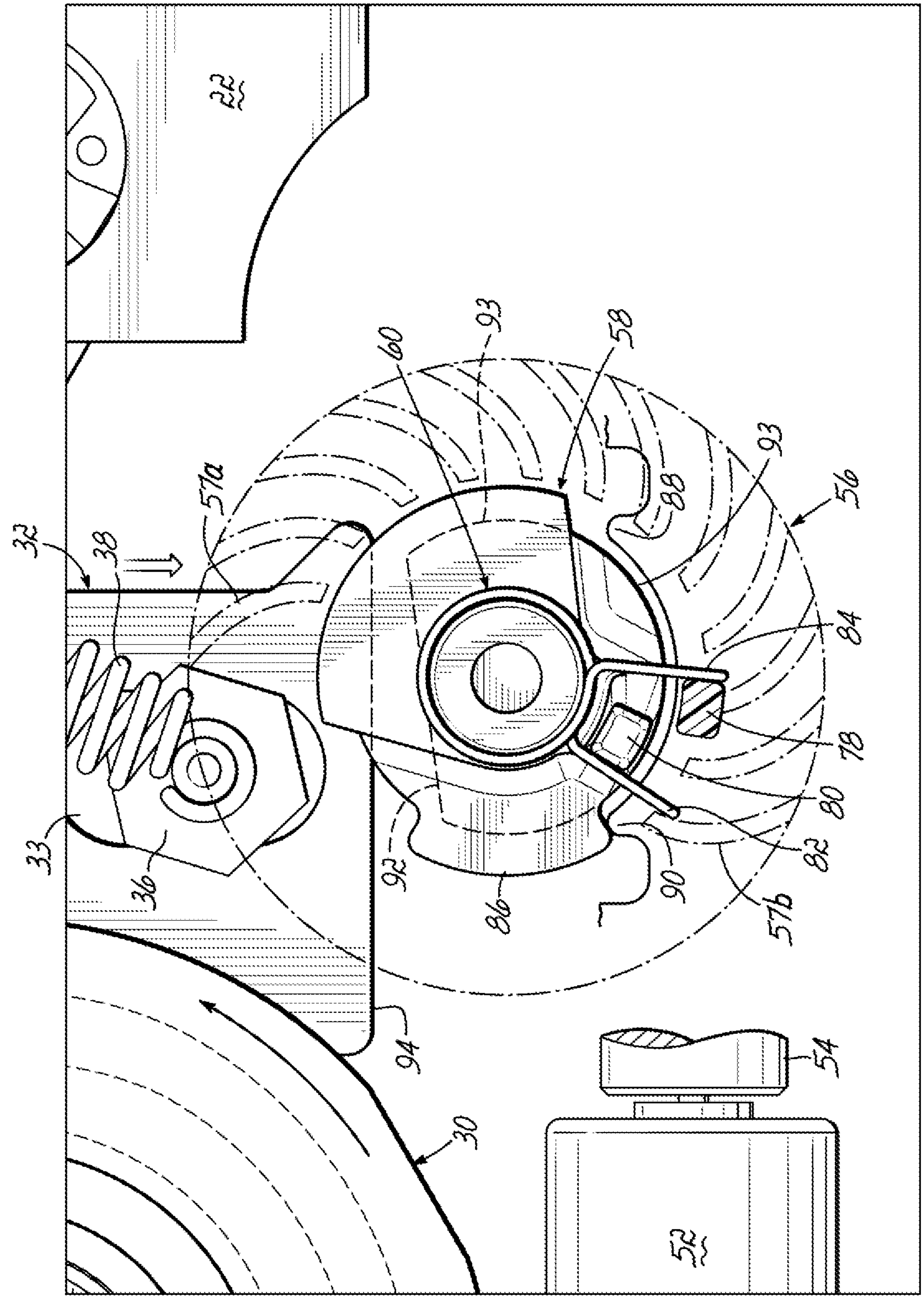
Figure 7E:
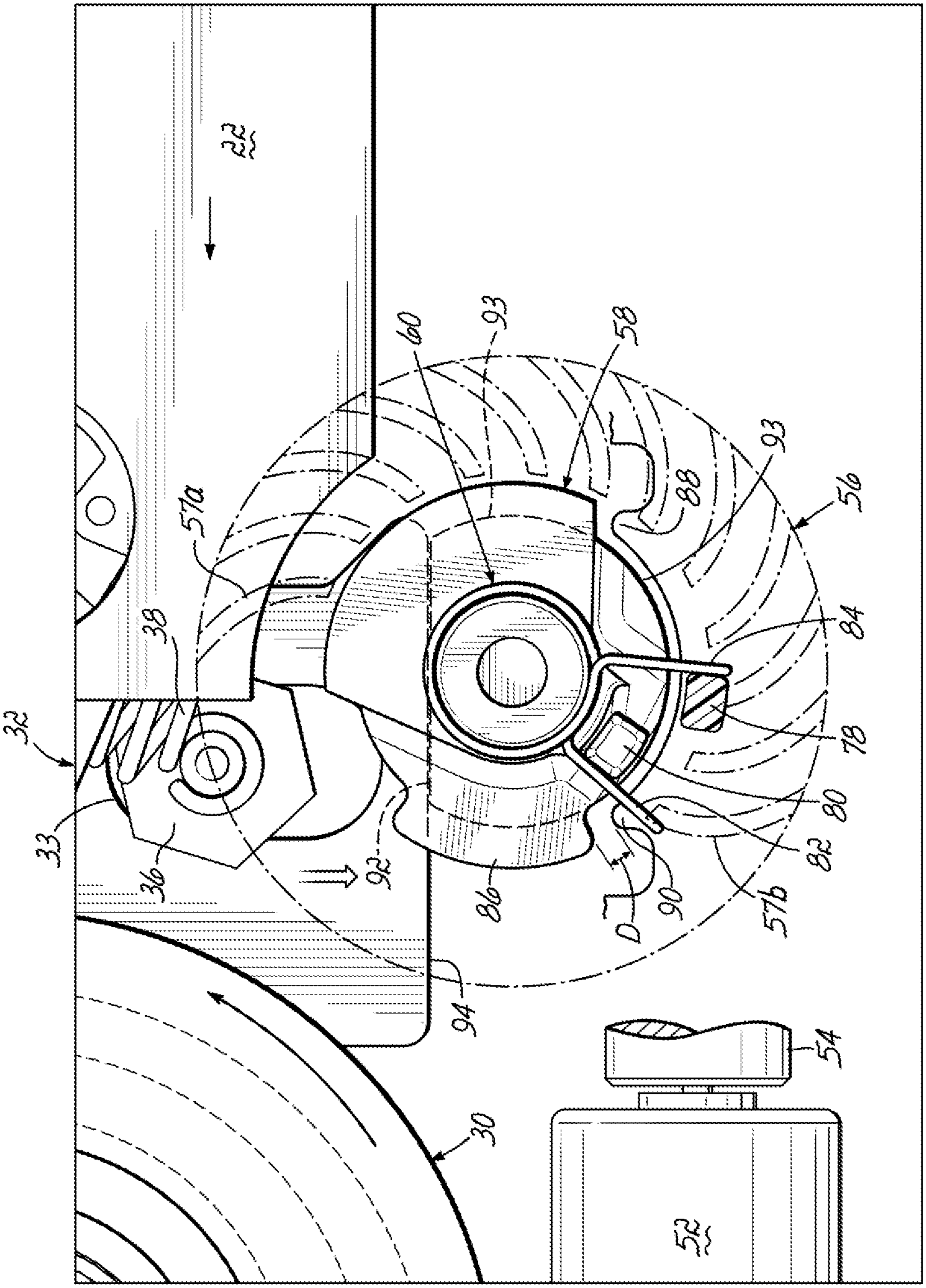

As shown in FIG. 7D, due to the counterclockwise bias from the first leg 82 on the second arm 80 and thus the blocker member 58, when the sliding member 32 disengages from the blocker member 58, the blocker member 58 rotates counterclockwise to reach an unlocking position. The rotation of the blocker member 58 to the unlocking position is limited due to the engagement between a protrusion 86 on the blocker member 58 and a second stop 90 of the casing 18. This engagement prevents the blocker member 58 from rotating further in the counterclockwise direction. As discussed above, the lever arm 40 follows the cammed surface 45 of rotary element 30 in a cammed relationship, but, before the hook 47 engages the mechanical detent or recess 66, the sliding member 32 is prevented from moving downward. As such, the sliding member 32 is prevented from re-engaging the blocker member 58. After the hook 47 of the lever arm 40 engages the mechanical detent or recess 66 of the rotary element 30, sliding member 32 is able to move in a downward direction relative to and towards the blocker member 58. Further rotation of the rotary element 30 by rotation of the lock dial 16 (see FIG. 1) moves the lock bolt 22 from the locked to the unlocked position, where the lock bolt 22 is retracted into the casing 18 in the unlocked position. The sliding member 32 includes the bottom portion 94 preferably having a shape complementary to a flat cam portion 92 of the blocker member 58. The engagement of the bottom portion 94 of the sliding member 32 and the flat cam portion 92 of the blocker member 58 causes the blocker member 58 to rotate in the clockwise direction a distance, indicated by the letter "D," away from the unlocking position, as shown in FIGS. 7E-7F.

Figure 7F:
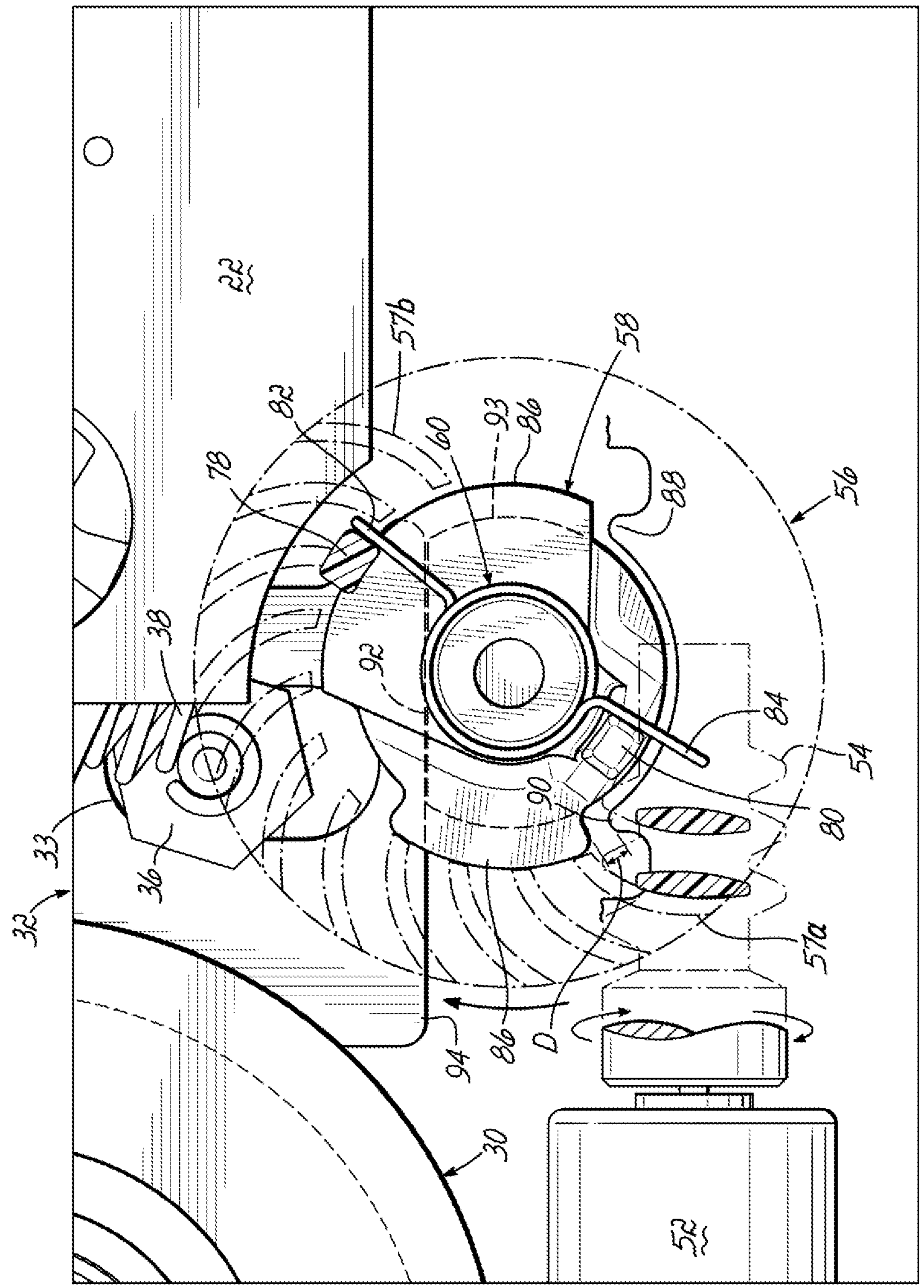
Figure 7G:
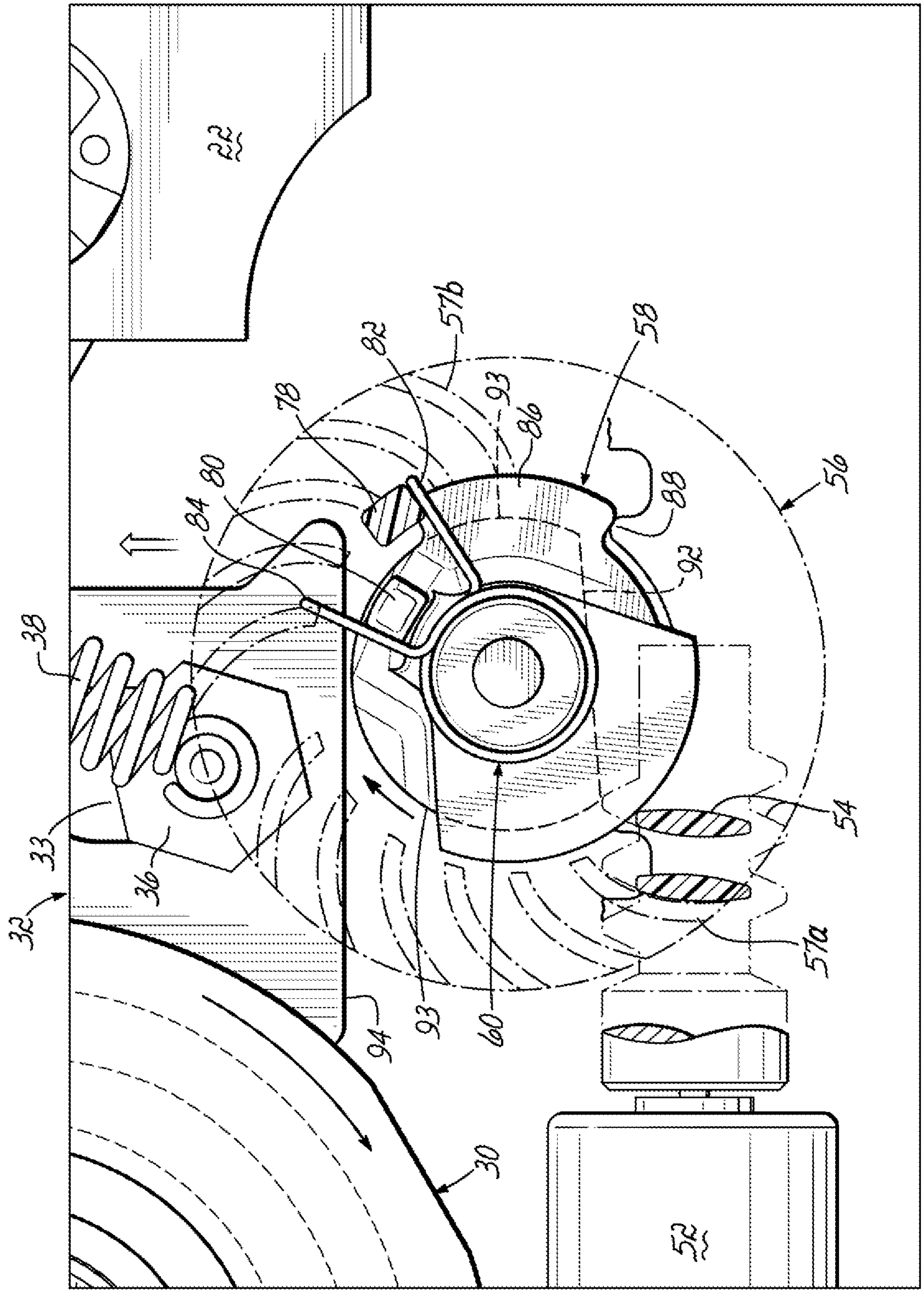

After a predetermined period of time, electricity is provided to the motor 52 to thereby rotate the worm gear 54 in the second direction, thereby rotating the face gear 56 in the clockwise direction back to the first position as shown in FIG. 7F. Alternatively, a sensor (not shown) is provided to detect the position of the lock bolt 22 and communicate with the motor 52 through a controller, such as a microcontroller 216 (see FIG. 12), to thereby drive the worm gear 54 based on the position of the lock bolt 22. By way of example, the sensor may sense whether the user has driven the lock bolt 22 into the unlocked position as described above. Upon sensing that the lock bolt 22 is in the unlocked position, the sensor may communicate with the controller to thereby supply power to the motor 52, thereby driving the worm gear 54 in a second direction, the second direction being opposite to the first direction and thereby rotating the face gear 56 from the second to the first position.

As the face gear 56 rotates from the second position to the first position, the first arm 78 engages with the first leg 82, thereby rotating the first leg 82 therewith. The rotation of the first leg 82 causes the second leg 84 to rotate in the clockwise direction, whereby the second leg 84 engages with the second arm 80. Further rotation of the second leg 84 is prevented due to the engagement with the second arm 80, which prevents further rotation in the clockwise direction due to the engagement of the bottom portion 94 of the sliding member 32 with the flat cam portion 92 of the blocker member 58. In this configuration, due to the relative movement and position between the first and second legs 82, 84 of the torsion spring 60, the first leg 82 biases the first arm 78 in a counterclockwise direction and the second leg 84 biases the second arm 80 in a clockwise direction.

As discussed above with respect to FIGS. 5A-5F and 6A-6D and as further shown in FIG. 7, the user rotates the lock dial 16 (see FIG. 1) in a clockwise direction to rotate the rotary element 30 and the lock bolt 22 moves from the unlocked position to the locked position. Accordingly, the hook 47 disengages in an upward direction from the mechanical detent or recess 66 of the rotary element 30. Further rotation of the rotary element 30 causes the hook 47 to again interact with the cammed surface 45 of the rotary element 30 in a cammed relationship. The upward movement of the lever arm 40 causes the sliding member 32 to move in an upward direction due to the coupled relationship between the lever arm 40 and the sliding member 32. The upward motion of the sliding member 32 disengages the sliding member 32 from the blocker member 58. Due to the bias on the second arm 80 by the second leg 84 in the clockwise direction, the disengagement of the sliding member 32 from the blocker member 58 allows the blocker member 58 to rotate in the clockwise direction to the locking position. The rotation to the locking position in the clockwise direction is limited by the engagement of the protrusion 86 of the blocker member 58 with the first stop 88. As discussed previously with respect to FIG. 7A, when the face gear 56 is in the first position and the blocker member 58 is in the locking position, the first leg 82 biases the first arm 78 in a counterclockwise direction and the second leg 84 biases the second arm 80 in a clockwise direction.

Many of the movements of components have been described directionally, for example, to move in a counterclockwise or clockwise direction. Persons skilled in the art will appreciate that the configuration of the components described in a directional manner may be configured in a manner such that the component moves in an opposite direction as described. By way of example, in an alternative embodiment, the worm gear 54 and face gear 56 may be configured such that the face gear 56 rotates in a clockwise direction to rotate from the first position to the second position and in a counterclockwise direction to rotate from the second to the first position.

In an alternative embodiment, rather than utilizing the torsion spring 60 as the biasing member, a spring clutch (not shown) is utilized. Specifically, the spring clutch is operatively coupled to the face gear 56 and the blocker member 58 in order to rotate the blocker member 58 in the similar or same manner as the torsion spring 60.

Figure 8:
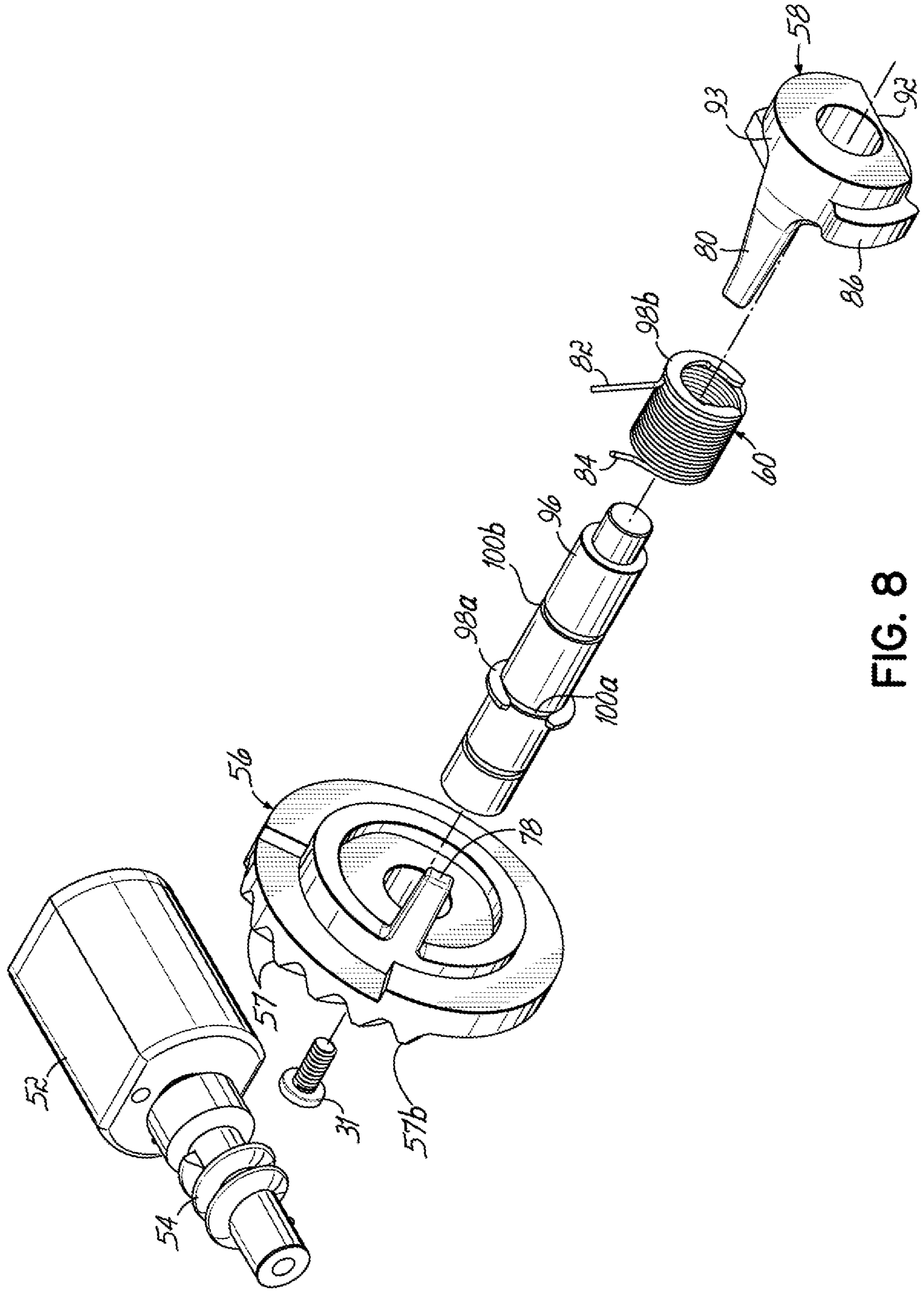
FIG. 8 is an exploded perspective view showing an interaction of a variety of elements of the device of FIG. 1.

FIG. 8 shows an exploded diagram of the motor 52, worm gear 54, face gear 56, and blocker member 58. Extending from the rear side of the face gear 56 is a shaft 96. The torsion spring 60 is situated on the shaft 96 and is located between two spring clips 98*a* and 98*b* that engage with recesses 100*a*, 100*b* on the shaft 96. The torsion spring 60 is allowed to freely rotate about the shaft 96 with respect to an axis extending along the center of the shaft 96. The blocker member 58 is situated on the shaft 96. The blocker member 58 is allowed to freely rotate about the shaft 96 with respect to the axis extending along the center of the shaft 96. The face gear 56 is allowed to freely rotate about the shaft 96 with respect to the axis extending along the center of the shaft 96. The shaft 96 is fixed to the casing 18 during assembly such that all degrees of freedom for shaft 96 will be fixed relative to the casing 18 once assembled.

Figure 9A:
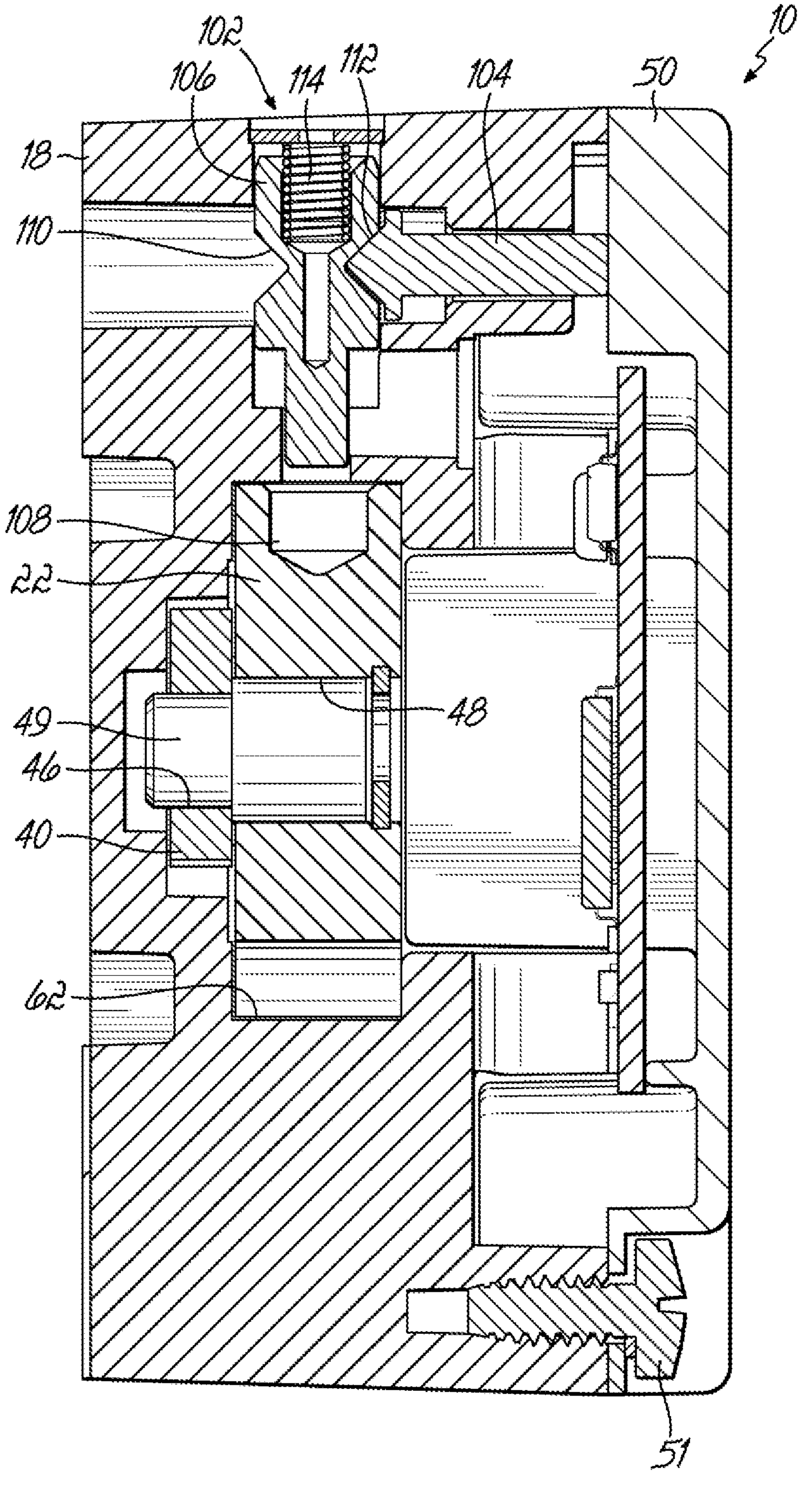
FIGS. 9A and 9B are cross-sectional views taken along section line 9A-9A of FIG. 5B showing a relock device of the device of FIG. 1.
Figure 9B:
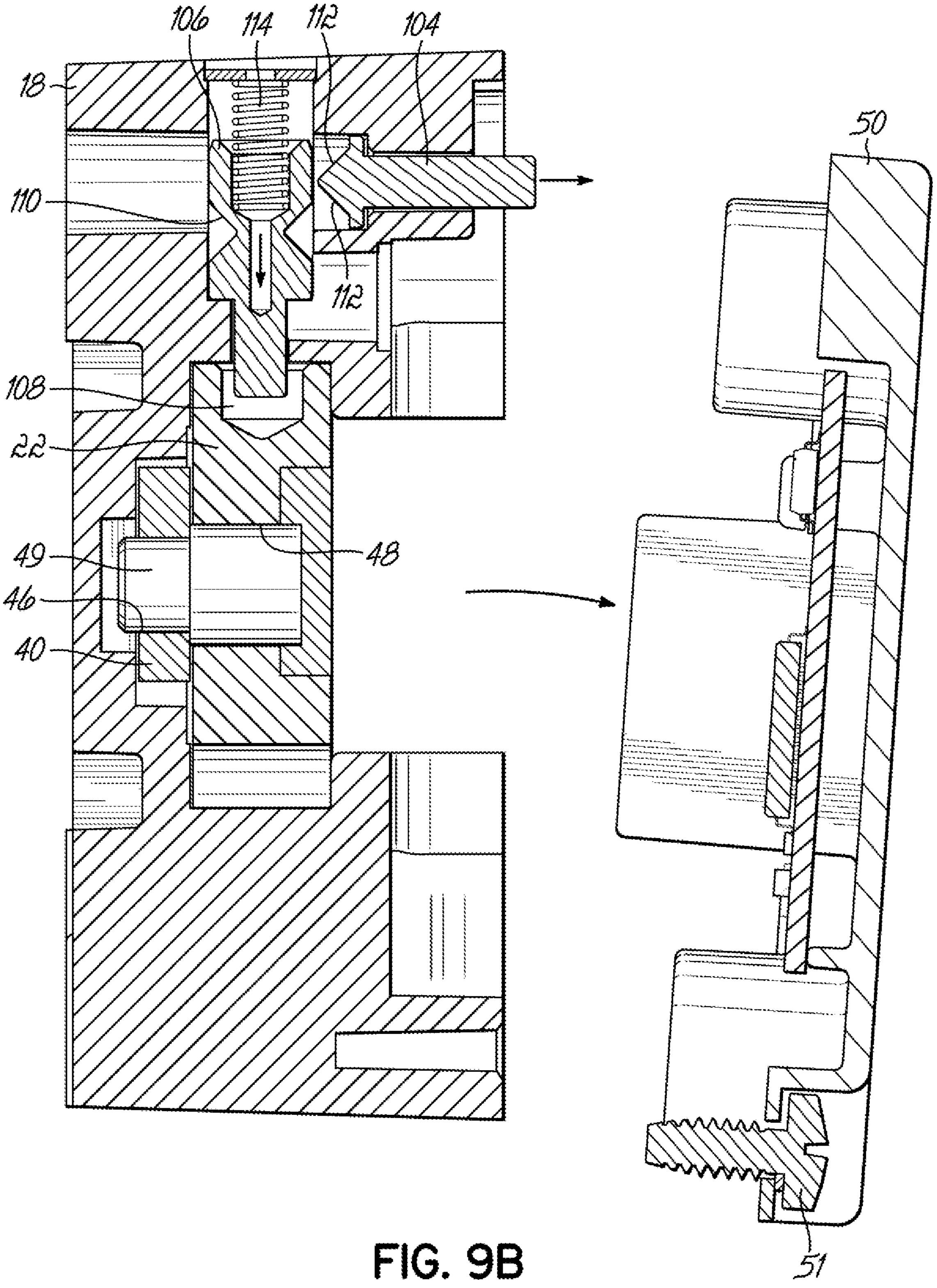

Referring to FIGS. 9A and 9B, the lock further includes a relock mechanism 102 which prevents movement of the lock bolt 22 from the locked to the unlocked position when the lock is tampered with or compromised in any manner. The relock mechanism 102 comprises a first pin 104 coupled to the back wall 50 of the casing 18. The first pin 104 is coupled to a spring-biased second pin 106 in a configuration that prevents a movement of the second pin 106 in the direction of the spring bias. The second pin 106 is situated above an aperture 108 in a superior portion of the lock bolt 22. In a preferred embodiment, the second pin 106 contains a recess 110 for accepting the free end 112 of the first pin 104. The free end 112 of the first pin 104 is preferably shaped according to the shape of the recess 110 in order to provide a complementary fit between the first and second pins 104, 106. Different shapes of the recess 110 of the second pin 106 and free end 112 of the first pin 104 are contemplated in order to provide alternative coupling configurations between the first and second pins 104, 106. The first and second pins 104, 106, before the back wall 50 of casing 18 have been tampered with, are preferably situated essentially perpendicular to one another, whereby the first pin 104 prevents a movement of the second pin 106 that is perpendicular to the first pin 104.

When the back wall 50 is tampered with, such as when the back wall 50 is at least partially removed, the first pin 104 decouples from the second pin 106. Due to the spring bias on the second pin 106 by a spring 114, the second pin 106 moves in the direction of the spring bias. Preferably, the second pin 106 is biased downwards towards the aperture 108 of the lock bolt 22 and in a direction perpendicular to the movement of the lock bolt 22 and enters the aperture 108 of the lock bolt 22 after being decoupled from the first pin 104. Alternatively, the second pin 106 could be suspended elsewhere within the casing 18 with respect to the lock bolt 22. For example, the second pin 106 may be suspended on a wall other than the back wall 50. As such, the aperture 108 in the lock bolt 22 would be situated to thereby allow the second pin 106 to enter the aperture 108 when the casing 18 is tampered with. The second pin 106 is manufactured with material properties that would enable it to resist the movement of the lock bolt 22 from the locked to the unlocked position.

Figure 10:
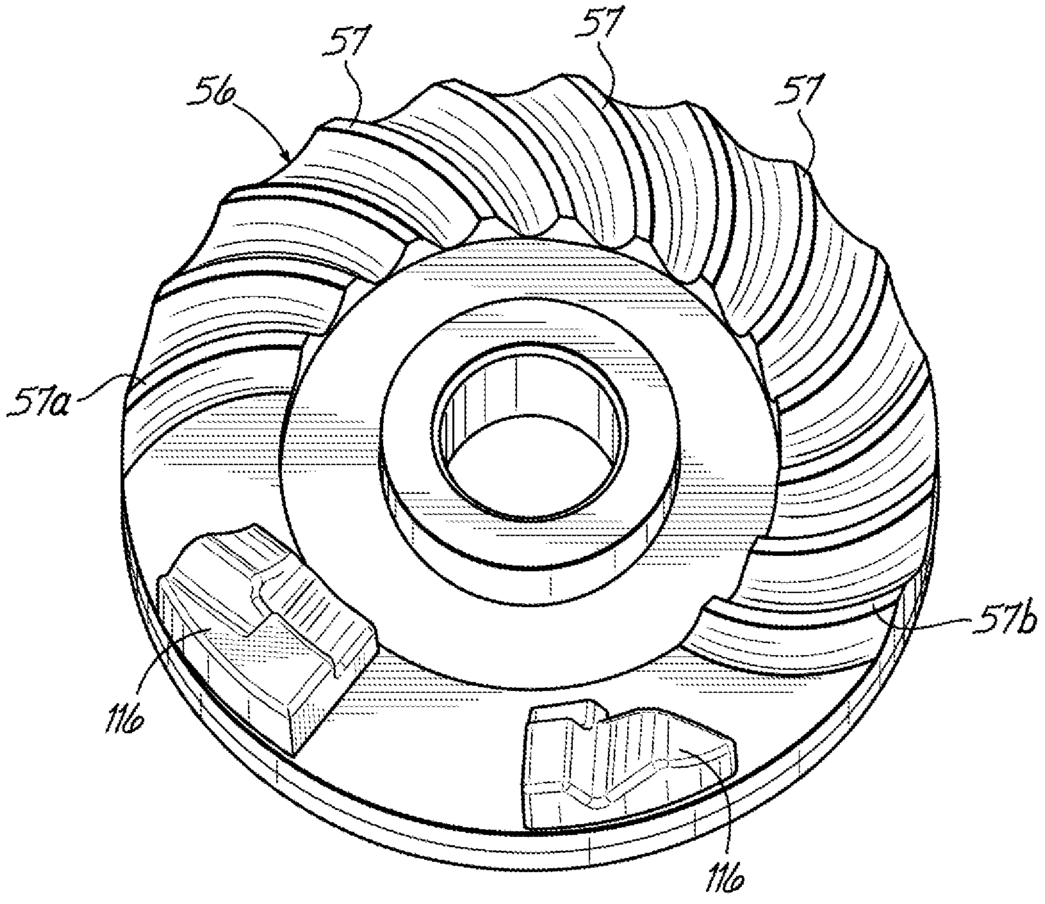
FIG. 10 is a perspective view of an alternative embodiment of a face gear according to the invention.

FIG. 10 shows the face gear 56 in an alternative embodiment. Rather than utilizing solely a spring bias from the torsion spring 60 to maintain a mesh between the face gear 56 and worm gear 54 as shown in FIG. 8, a pair of stopper members 116 project from the face gear 56 as shown in FIG. 10. The stopper members 116 are so situated to prevent the worm gear 54 from rotating further and, in turn, cause the face gear 56 to cease meshing with the worm gear 54. Preferably, there are two stopper members 116 disposed on a front face of the face gear 56 having a shape adapted to interact with the worm gear 54 such that the worm gear 54 is unable to continue rotation once engaged with one of the stopper members 116 when the face gear 56 rotates between the locking and unlocking positions. This configuration ensures that mesh is maintained between worm gear 54 and face gear 56.

Figure 11:
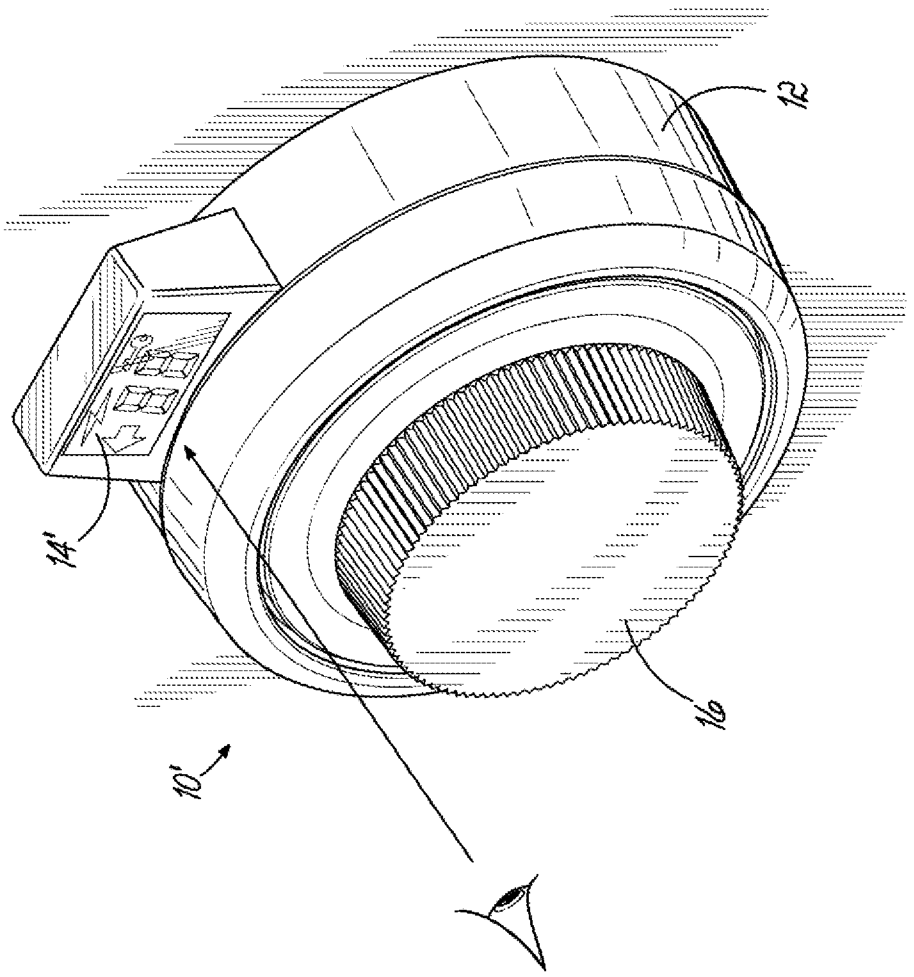
FIG. 11 is a perspective view of an alternative embodiment of a device according to the invention.

Referring to FIG. 11, an alternative embodiment of a device 10' includes the lock dial 16 and a display 14'. In this embodiment, the display 14' is front facing. The display 14' is configured to be facing frontwards for ease of use reasons. For example, the front facing display 14' is advantageous in situations such as where the lock is disposed on a safe that is in an elevated position. Some users may not be tall enough to see the upwardly facing display in such a situation. Therefore, it is advantageous to provide the front facing display 14' for such a situation.

Figure 12:
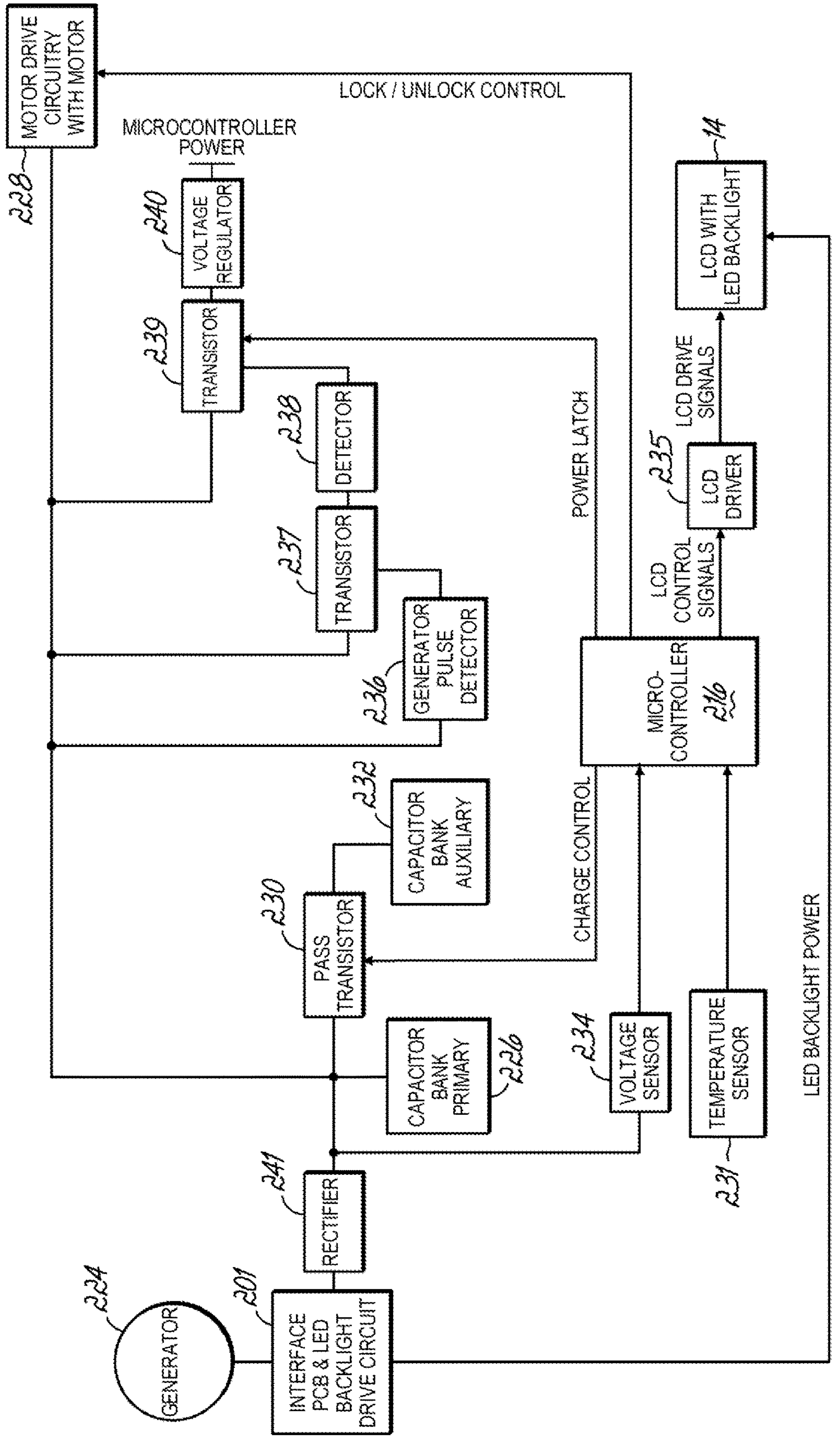
FIG. 12 is a schematic diagram of a generator-motor circuit of the device of FIG. 1.
Figure 13A:
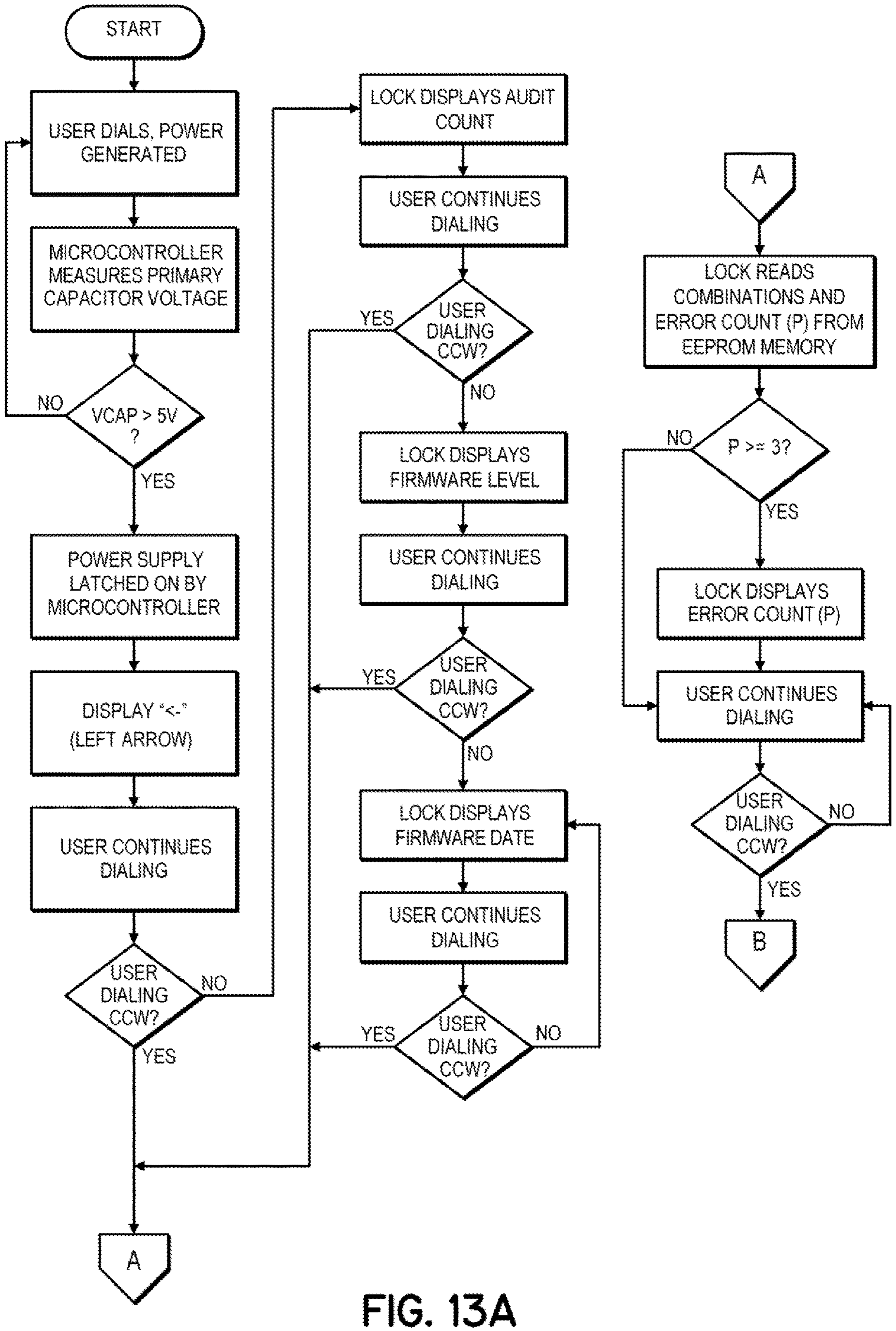
FIGS. 13A-13D are flowcharts explaining the operation of the device of FIG. 1.
Figure 13B:
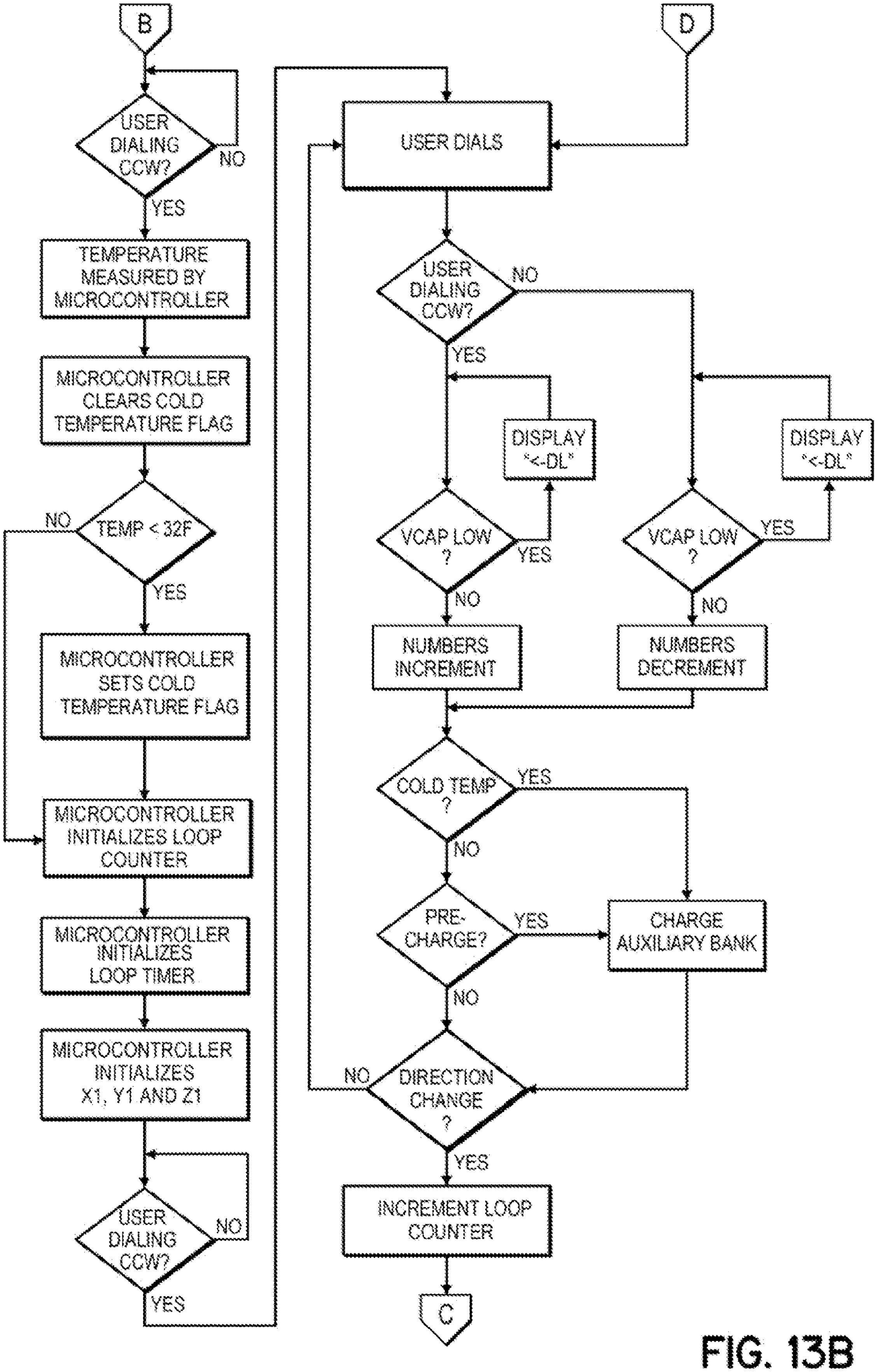
Figure 13C:
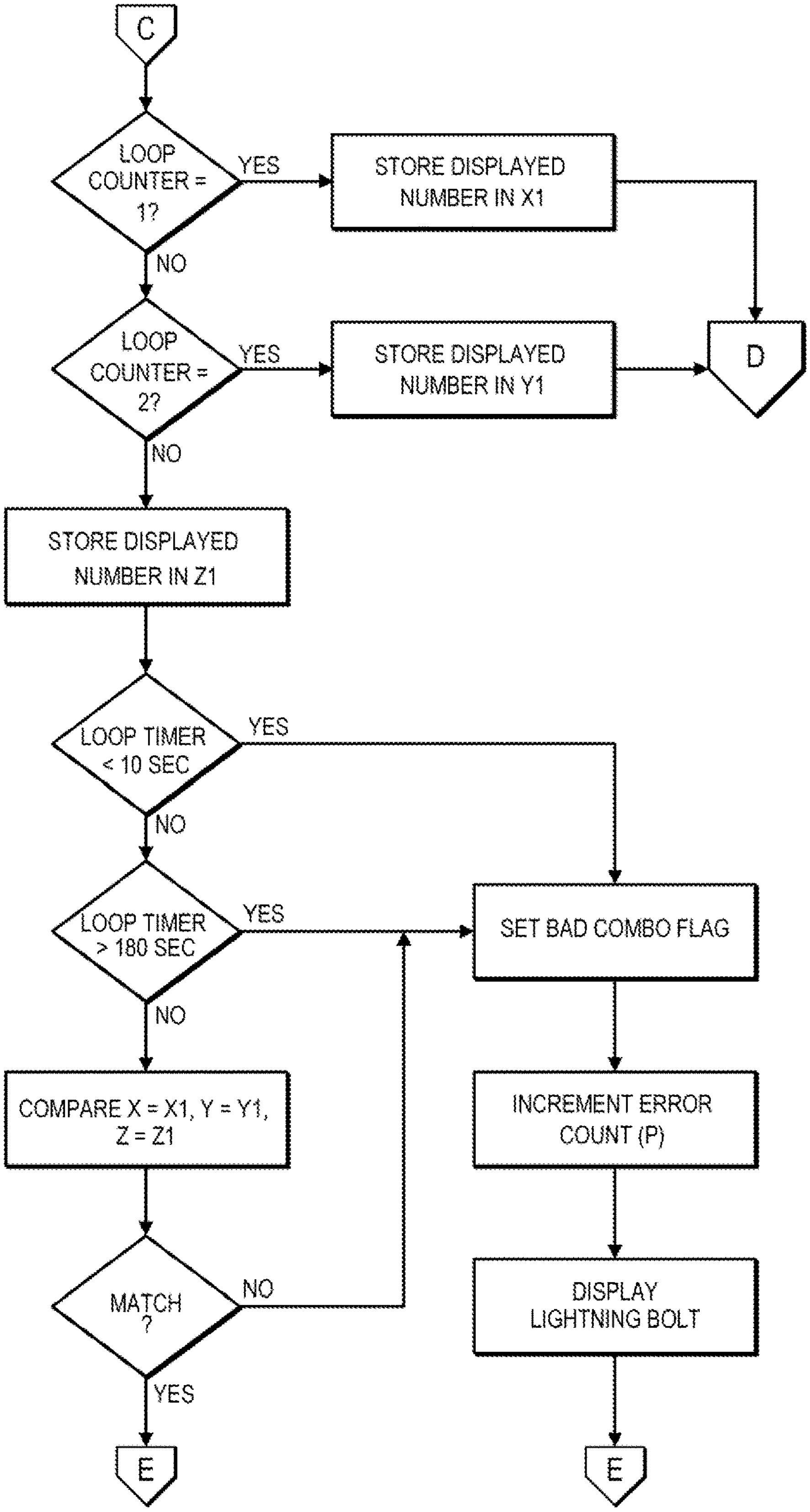
Figure 13D:
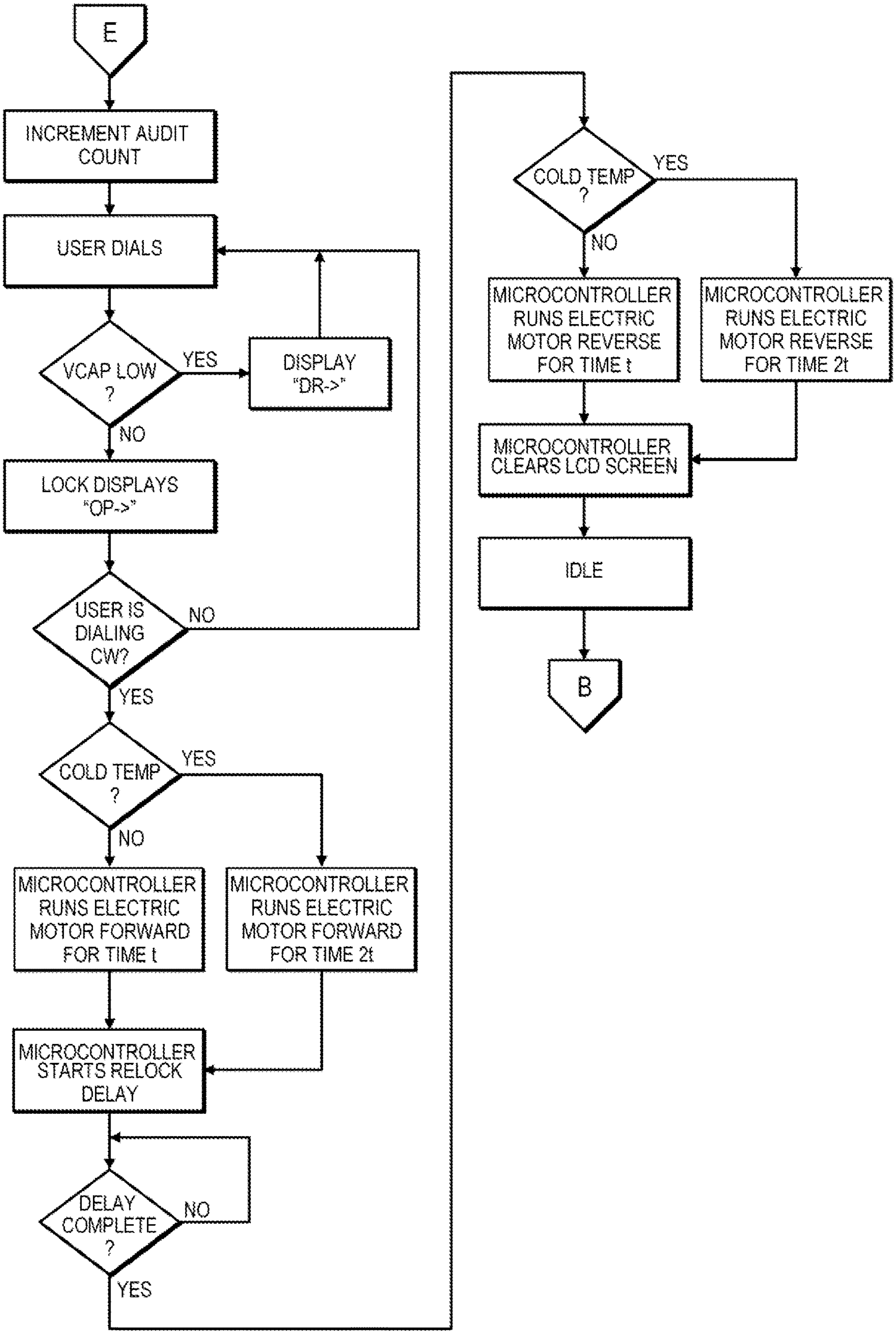

FIG. 12 shows an exemplary generator-motor circuit 200 according to an exemplary embodiment of the device 10 having the lock dial 16, i.e., user input device 16, as described above, the operation of which is described in more detail below. The lock dial 16 is operatively coupled to a generator 224. The generator 224 is operatively coupled with a rectifier 241 for converting AC power into DC pulses for use with the remainder of the circuit 200. The rectifier 241 is operatively connected to a primary capacitor bank 226, a generator pulse detector 236, a motor driver circuitry having an electric motor 228, and first, second, and third pass transistors 230, 237, 239, which direct the DC pulses from the rectifier 241. The first pass transistor 230 selectively directs DC pulses to an auxiliary capacitor bank 232 in order to charge the auxiliary capacitor bank 232 in certain situations, as described in more detail below. The second pass transistor 237 selectively directs DC pulses to a voltage detector 238, which, in turn, directs the third pass transistor 239. Accordingly, the third pass transistor 239 directs DC pulses to a voltage regulator 240 for powering a microcontroller 216, or other controller. The circuit 200 further includes a voltage sensor 234 and a temperature sensor 231, each communicating with the microcontroller 216. The motor drive circuitry having the electric motor 228 is driven by the electricity sent to it by the microcontroller 216.

Furthermore, the generator 224 is operatively connected to the LCD display 14 having an LED backlight. The circuit 200 further includes an interface PCB & LED backlight drive circuit 201. The generator 224 provides electricity to the LED backlight of the LCD display 14 as well as the microcontroller 216, which provides LCD control signals to an LCD driver module 235. As such, the LCD driver module 235 provides LCD drive signals to the LCD display 14. However, the LCD drive signals and the LED backlight drive are powered independently from each other via the generator 224.

FIG. 12 shows an exemplary embodiment of the generator-motor circuit 200 according to exemplary embodiments of device 10 having the lock dial 16 for the user input device 16 as described above. Also, the microcontroller 216 is mounted on a circuit board (not shown) within the device 10. The microcontroller 216 is operatively connected to the display 14 to control the device 10 by a specific set of operating instructions. Exemplary operation of the circuit 200 is diagrammed in FIGS. 13A-13D and each should be considered with reference to the circuit 200 shown in FIG. 12.

FIGS. 13A-13D show flow diagrams of the lock operation. In the operational mode of FIGS. 13A-13D, once a rotation of the lock dial 16 is detected, the lock power activates and obtains authentication information or the proper combination values X, Y, Z from memory along with a value P that represents the number of incorrect combination entries attempted since the last unlocking of the lock. Specifically, the display 14 is a Liquid Crystal Display configured to indicate the numerical value N input by the user via the lock dial 16, and actions for the user including dialing left (←DL), dialing right (DR→), and open right (OP→). In addition, the display 14 will display a lightning bolt symbol when the user has entered an improper combination and a key symbol when a change key (not shown) is inserted into the device 10.

More specifically, according to FIG. 12 and FIGS. 13A-13D, rotation of the lock dial 16 in either the clockwise (CW) or counterclockwise (CCW) direction generates power for storage in the primary capacitor bank 226 via the generator 224. For reference, the rotation CW or CCW with respect to FIGS. 13A-13D is in relation to the user viewing the front of the lock dial 16. On initial power up, the primary and auxiliary capacitor banks 226, 232 are discharged. As the user turns the lock dial 16, generated AC power is rectified into DC pulses. The DC pulses charge the primary capacitor bank 226. The DC pulses are detected by the generator pulse detector 236, which turns on the second pass transistor 237 with each DC pulse. The voltage of the primary capacitor bank 226 is communicated to the voltage detector 238. Generally, the initial voltage charge will not exceed a threshold voltage limit of the voltage detector 238 until the user turns the lock dial 16 to generate sufficient voltage. Once the voltage exceeds the threshold voltage limit, the third pass transistor 239 is turned on. Accordingly, the primary capacitor bank 226 directs stored charge to the voltage regulator 240 and powers on the microcontroller 216. The microcontroller 216 then turns on the third pass transistor 239 for directing power to the microcontroller 216 even if rotation of the lock dial 16 ceases for some period of time. As rotation of the lock dial 16 continues, the microcontroller 216 monitors the voltage of the primary capacitor bank 226 in order to display user prompts and continue operation as described below. In addition, the primary capacitor bank 226 is electrically connected to the microcontroller 216 and the electric motor 228. However, the auxiliary capacitor bank 232 is also electrically connected to the electric motor 228 via the first pass transistor 230 for providing additional power in cold temperature conditions, such as below 32° F., the purpose of which will be described below in more detail.

The lock dial 16 is rotated until a minimum voltage is detected by the microcontroller 216. According to the exemplary embodiment, an analog-to-digital converter (not shown) is manufactured into the microcontroller 216 to detect, or otherwise sense, voltage. However, it will be appreciated that any device or method of detecting voltage may similarly be used. In any case, once the minimum voltage, such as 5 volts, is detected from the primary capacitor bank 226, the display 14 indicates for the user to dial left, i.e., CCW. Should the user dial CCW, the user may input a combination as described below. However, should the user dial right, i.e., CW, the display 14 indicates an audit count. The user may repeat dialing right to indicate both the firmware level and repeat again for the firmware date on the display 14.

Once the user initiates the CCW rotation of the lock dial 16, the microcontroller 216 obtains the value of P from memory. If P has a value of 3 or greater, the display 14 indicates this value. At this point, the device 10 initiates detection of the ambient temperature via a temperature sensor 231 operatively connected to the microcontroller 216. The microcontroller 216 compares the measured ambient temperature to a predetermined temperature at which the effects of ESR diminish the ability of the primary capacitor bank 226 to operate the electric motor 228, otherwise referred to herein as the ESR threshold temperature. Regardless of whether or not the ambient temperature is above the ESR threshold temperature, the generator 224 electrically charges the primary capacitor bank 226.

In the event that the measured ambient temperature is below the ESR threshold temperature, the microcontroller 216 operates the first pass transistor 230 and charges both the primary and auxiliary capacitor banks 226, 232. The microcontroller 216 then senses the voltage stored in the available capacitor banks. In other words, depending on the ambient temperature, the generator 224 charges the primary capacitor bank 226 or both primary and auxiliary capacitor banks 226, 232, in anticipation of operating the device 10. In addition, the microcontroller 216 continues to sense the voltage charge in the available capacitor banks throughout the operation of the device 10. Should the detected voltage drop below the predetermined charge value for the ambient temperature, the display 14 will indicate for the user to either dial right or dial left, depending on the status of the operation. In this way, the device 10 will remain charged throughout the operation of the device 10 shown in FIGS. 13A-13D.

Once the microcontroller 216 detects the ambient temperature and accommodates for any effect of ESR as directed above, the microcontroller 216 initializes a loop timer and obtains X, Y, and Z values from memory. After verifying the detected voltage and detecting that CCW rotation has stopped and CW rotation has begun, then the microcontroller 216 stores the entered dial value at the stop as X1. This process is repeated to obtain values for Y1 and Z1. Next, the microcontroller 216 verifies if the entered values X1, Y1, Z1 match the proper combination values X, Y, Z. If the values match, the operation will proceed as described below. If the values do not match or the entire combination was entered in less than ten seconds, the display 14 will indicate a lightning bolt, P will be increased, and the lock will power off. This may be generally referred to as an entry error. In addition, the device will shutdown, or otherwise timeout, without error if the user's time between inputting the combination values X1, Y1, Z1 exceeds 40 seconds. However, if the user's total time to input the combination is greater than 180 seconds, the entry will again be treated as an entry error.

With the entries correct and the device 10 charged, the microcontroller 216 again senses the ambient temperature to determine whether cold temperature conditions are present. If the ambient temperature is above the ESR threshold temperature, the primary capacitor bank 226 is operatively connected to the electric motor 228. The microcontroller 216 then verifies the amount of charge in the primary capacitor bank 226 before finally discharging the primary capacitor bank 226 and activating the electric motor 228. If the ambient temperature is below the ESR threshold temperature, both the primary capacitor bank 226 and the auxiliary capacitor bank 232 are operatively connected to the electric motor 228 via the first pass transistor 230. The microcontroller 216 then verifies the amount of charge in the available capacitor banks before finally discharging each of the available capacitor banks and activating the electric motor 228. Finally, the display 14 indicates for the user to open to the right so that the lock bolt 22 (see FIG. 3) may be retracted by the user.

Furthermore, the device 10 also conserves power while powered off. Specifically, the microcontroller 216 will turn off the third pass transistor 239. This deprives the voltage regulator 240 of power, which, consequently, turns off the microcontroller 216. Given that the third pass transistor 239 is biased to be turned off, minimal current flows from either of the primary and auxiliary capacitor banks 226, 232. Thus, the primary and auxiliary capacitor banks 226, 232 retain charge for longer periods of time. On subsequent power up, energy is more likely to be retained in the primary and auxiliary capacitor banks 226, 232 depending on the elapsed time since the previous operation of the device 10. For instance, the device 10 may power on in as little as one rotation of the lock dial 16. In any case, this enhances the user experience by conserving energy and requiring less rotation of the lock dial 16 to charge the device 10 than would otherwise be necessary.

With regard to conserving excess charge produced by the generator 224, a voltage limiting diode (not shown) is traditionally used to ground excess charge within the primary capacitor bank 226 when the auxiliary capacitor bank 232 is not in use. However, the device 10 will effectively precharge the auxiliary capacitor bank 232 rather than ground excess charge from the primary capacitor bank 226. More particularly, the device 10 retains energy in the auxiliary capacitor bank 232 by isolating the excess power with the first pass transistor 230. The excess electricity being generated is sensed by the microcontroller 216. In this way, the user experience is again enhanced by conserving energy and requiring less rotation of the lock dial 16 to charge the device 10, especially when activating the electric motor 228 with both the primary and auxiliary capacitor banks 226, 232.

For instance, when the ambient temperature is above the ESR threshold temperature, the microcontroller 216 will pulse the first pass transistor 230 both on and off in order to precharge the auxiliary capacitor bank 232. Specifically, when the first pass transistor 230 is off, the generator 224 does not charge the auxiliary capacitor bank 232. When the first pass transistor 230 is on, the generator 224 charges the auxiliary capacitor bank 232. The first pass transistor 230 is pulsed on when the primary capacitor bank 226 is above a predetermined charge and pulsed off when the primary capacitor bank 226 is below the predetermined charge. For example, the predetermined minimum charge may be 9 volts. However, when both the primary and auxiliary capacitor banks 226, 232 are equal to the predetermined charge, the voltage limiting diode (not shown) grounds the excess charge.

The device 10 may also include "LCD over-modulation" as an added security benefit. Specifically, when the display 14 is LCD, the display 14 communicates with an LCD driver module 235 operatively connected to the microcontroller 216. Traditionally, the microcontroller 216 directs the LCD driver module 235 to operate particular LCD segments shown on the LCD display 14. These LCD segments are "flickered" in rapid succession in order to prevent damage to the LCD display 14. However, the rate of this rapid flicker is traditionally determined by the clock signal of the microcontroller 216, which, according to an exemplary embodiment, may vary between 125 kHz and 899 kHz. For example, the number N=25 may always display at a clock signal frequency of 250 kHz for a traditional display. However, according to an exemplary embodiment of the device 10, the LCD driver module 235 is configured to receive the data from the microcontroller 216 and convert the clock signal to a unique clock signal representative of the intended number. Going further, the LCD driver module 235 randomizes the unique clock signal for any given number. For example, the number "25" may display once at 862 kHz and another time at 125 kHz. In this way, any attempts to detect the frequency of the LCD display 14 will result in a wide array of detected frequencies; thus, making it more difficult to tie a particular frequency to a particular number.

Finally, the above operation of the device 10 uses a traditional three-number entry sequence. It will be appreciated that the device 10 may also be operated according to a dual combination mode or a supervisor/subordinate mode. Furthermore, while the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A self-powered lock, comprising:

a lock operable by a motor;

a controller;

a manually operable electricity generator generating electricity upon manual actuation by a user, the electricity being used to supply power input to the controller;

an electricity storage device storing electricity generated by the electricity generator; and a display device operatively connected to the controller, wherein at least a portion of the electricity stored by the electricity storage device is used by the motor to enable the lock to be unlocked, the electricity storage device is configured to store an unused portion of electricity after the lock is operated, the unused portion of electricity usable for a subsequent lock operation to supply power input to the controller, and the controller is configured to indicate to the user that further manual actuation of the generator is needed when additional electricity is required to operate the motor and the controller signals the display device to display an electronic indication to the user that further manual actuation of the generator is needed to generate the additional electricity.

2. The self-powered lock of claim 1, wherein the manually operable electricity generator further comprises a rotatable member configured to rotatably generate electricity.

3. The self-powered lock of claim 2, wherein the display device further includes a backlight, and the backlight is electrically connected to the electricity generator and the electricity storage device.

4. The self-powered lock of claim 1, wherein the controller is configured to determine whether additional electricity is required to operate the motor.

5. A method of powering a lock having a manually operable electricity generator electrically connected to a motor, the method comprising:

generating electricity upon manual actuation of the electricity generator by a user;

supplying electricity generated by the electricity generator to the motor for operating the lock;

storing an unused portion of the electricity generated by the electricity generator in an electricity storage device after the lock is operated, the unused portion of electricity usable for a subsequent lock operation to supply power input to a controller;

indicating to the user with the controller that further manual actuation of the electricity generator is needed when additional electricity is required;

communicating to a display device with the controller;

displaying an electronic indication to the user with the display device that further manual actuation of the electricity generator by the user is needed for supplying the additional electricity;

supplying electricity to the display device from the electricity storage device; and wherein the display device further includes a backlight and the method further comprises supplying electricity to the backlight from the electricity storage device while simultaneously supplying electricity to the motor from the electricity storage device.

6. The method of claim 5, further comprising determining with the controller whether additional electricity is required to operate the motor.

* * * * *